US008710784B2

(12) United States Patent
Meyer et al.

(10) Patent No.: US 8,710,784 B2
(45) Date of Patent: Apr. 29, 2014

(54) VEHICLE SEATING SYSTEM AND METHOD FOR REDUCING FATIGUE WITH CHANGING ACTUATOR MOVEMENT

(75) Inventors: Daniel C. Meyer, Pendleton, IN (US); Paul B. Phipps, Fishers, IN (US); Thomas D. Epply, Anderson, IN (US)

(73) Assignee: Innovative Biomechanical Solutions, LLC, Indianapolis, IN (US)

( * ) Notice: Subject to any disclaimer, the term of this patent is extended or adjusted under 35 U.S.C. 154(b) by 301 days.

(21) Appl. No.: 13/228,988

(22) Filed: Sep. 9, 2011

(65) Prior Publication Data

US 2013/0062921 A1    Mar. 14, 2013

(51) Int. Cl.
*G05B 5/00* (2006.01)
*H02H 7/085* (2006.01)

(52) U.S. Cl.
CPC .................................. *H02H 7/0851* (2013.01)
USPC .............................. 318/466; 318/445; 318/467

(58) Field of Classification Search
CPC .................................................... H02H 7/0851
USPC .......................... 318/466, 344, 345, 445, 467
See application file for complete search history.

(56) References Cited

U.S. PATENT DOCUMENTS

| | | |
|---|---|---|
| 4,722,550 A | 2/1988 | Imaoka et al. |
| 4,728,873 A | 3/1988 | Inoue et al. |
| 4,840,425 A | 6/1989 | Noble |
| 4,853,687 A | 8/1989 | Isomura et al. |
| 4,888,535 A | 12/1989 | Brusasco |
| 5,005,904 A | 4/1991 | Clemens et al. |
| 5,097,185 A | 3/1992 | Ogasawara |
| 5,127,708 A | 7/1992 | Kishi et al. |
| 5,129,704 A | 7/1992 | Kishi et al. |
| 5,155,685 A | 10/1992 | Kishi et al. |
| 5,243,267 A | 9/1993 | Ogasawara |
| 5,263,765 A | 11/1993 | Nagashima et al. |
| 5,285,139 A | 2/1994 | Ogasawara |
| 5,319,248 A * | 6/1994 | Endou .......................... 307/10.1 |
| 5,320,409 A | 6/1994 | Katoh et al. |
| 5,321,617 A | 6/1994 | Mori et al. |
| 5,411,468 A | 5/1995 | Chen |
| 5,455,494 A | 10/1995 | Ogasawara |
| 5,490,713 A | 2/1996 | Fukuoka |
| 5,497,326 A | 3/1996 | Berland et al. |

(Continued)

FOREIGN PATENT DOCUMENTS

WO    WO 2007/041099 A    4/2007

OTHER PUBLICATIONS

"2010 Ford Taurus: More Hot, Less Bull", http://jalopnik.com/5116508/2010-ford-taurus-more-hot-less-bull, last accessed Jan. 13, 2009.

(Continued)

*Primary Examiner* — Bentsu Ro
*Assistant Examiner* — David Luo
(74) *Attorney, Agent, or Firm* — Woodard, Embardt, Moriarty, McNett & Henry LLP

(57) ABSTRACT

A system comprises a vehicle seating system including a seat and at least one powered seat adjustment actuator for altering the seating position formed by the seat. Additionally, the system includes a controller for receiving at least one signal based on at least one vehicle/user event. For reducing fatigue, the controller controls slow seat movement while the vehicle is moving, and changes slow movement between first and second slow movements based on the vehicle/user event(s).

22 Claims, 31 Drawing Sheets

(56) References Cited

U.S. PATENT DOCUMENTS

| | | | |
|---|---|---|---|
| 5,498,061 A | 3/1996 | Fukuoka | |
| 5,507,557 A | 4/1996 | Fukuoka | |
| 5,516,192 A | 5/1996 | Fukuoka | |
| 5,523,664 A | 6/1996 | Ogasawara et al. | |
| 5,533,784 A | 7/1996 | Fukuoka | |
| 5,542,741 A | 8/1996 | Fukuoka | |
| 5,556,161 A | 9/1996 | Fukuoka | |
| 5,637,076 A | 6/1997 | Hazard et al. | |
| 5,647,633 A | 7/1997 | Fukuoka | |
| 5,812,399 A | 9/1998 | Judic et al. | |
| 5,816,653 A | 10/1998 | Benson | |
| 5,860,699 A | 1/1999 | Weeks | |
| 5,894,207 A | 4/1999 | Goings | |
| 5,903,122 A | 5/1999 | Mesnage et al. | |
| 5,930,152 A | 7/1999 | Dumont et al. | |
| 5,934,748 A | 8/1999 | Faust et al. | |
| 6,007,151 A | 12/1999 | Benson | |
| 6,033,021 A | 3/2000 | Udo et al. | |
| 6,049,748 A | 4/2000 | Newman et al. | |
| 6,053,880 A | 4/2000 | Sleichter, III | |
| 6,055,473 A | 4/2000 | Zwolinski et al. | |
| 6,129,419 A | 10/2000 | Neale | |
| 6,497,454 B1 | 12/2002 | Davidsson | |
| 6,590,354 B2 | 7/2003 | Hein | |
| 6,592,533 B1 | 7/2003 | Yonekawa et al. | |
| 6,677,720 B2 * | 1/2004 | Fraser | 318/445 |
| 6,682,494 B1 | 1/2004 | Sleichter, III et al. | |
| 6,814,410 B2 | 11/2004 | Piaulet et al. | |
| 6,820,895 B2 | 11/2004 | Levine | |
| 7,113,100 B2 | 9/2006 | Yoshinori et al. | |
| 7,145,263 B2 | 12/2006 | Nathan et al. | |
| 7,152,920 B2 | 12/2006 | Sugiyama et al. | |
| 7,172,247 B2 | 2/2007 | Beloch et al. | |
| 7,239,096 B2 * | 7/2007 | Hancock et al. | 318/59 |
| 7,322,651 B2 | 1/2008 | Makhsous et al. | |
| 7,422,285 B2 | 9/2008 | Phipps | |
| 7,532,964 B2 | 5/2009 | Fujita et al. | |
| 7,566,096 B2 | 7/2009 | Phipps | |
| 7,585,024 B2 | 9/2009 | Rogers | |
| 2002/0070591 A1 | 6/2002 | Nivet | |
| 2002/0190549 A1 | 12/2002 | Chien-Chuan | |
| 2003/0075959 A1 | 4/2003 | Xue et al. | |
| 2004/0122574 A1 | 6/2004 | Inman et al. | |
| 2005/0127728 A1 | 6/2005 | Sugiyama | |
| 2007/0241595 A1 | 10/2007 | Nathan et al. | |
| 2008/0091322 A1 | 4/2008 | Phipps | |
| 2009/0005938 A1 | 1/2009 | Phipps | |

OTHER PUBLICATIONS

"How Stuff Works 1990-1999 Cadillac" http://auto.howstuffworks.com/1990-1999-cadillac9.htm, last accessed Jan. 27, 2009.

European Search Report for EP 08253931.3-2424 dated Jul. 8, 2009.

International Search Report for PCT/US06/37475, dated Jul. 16, 2007.

International Search Report, International Application No. PCT/US08/51563, dated Jul. 1, 2008.

Written Opinion for PCT/US06/37475, dated Jul. 16, 2007.

Written Opinion of the International Searching Authority, International Application No. PCT/US08/51563, dated Jul. 1, 2008, 5 pages.

\* cited by examiner

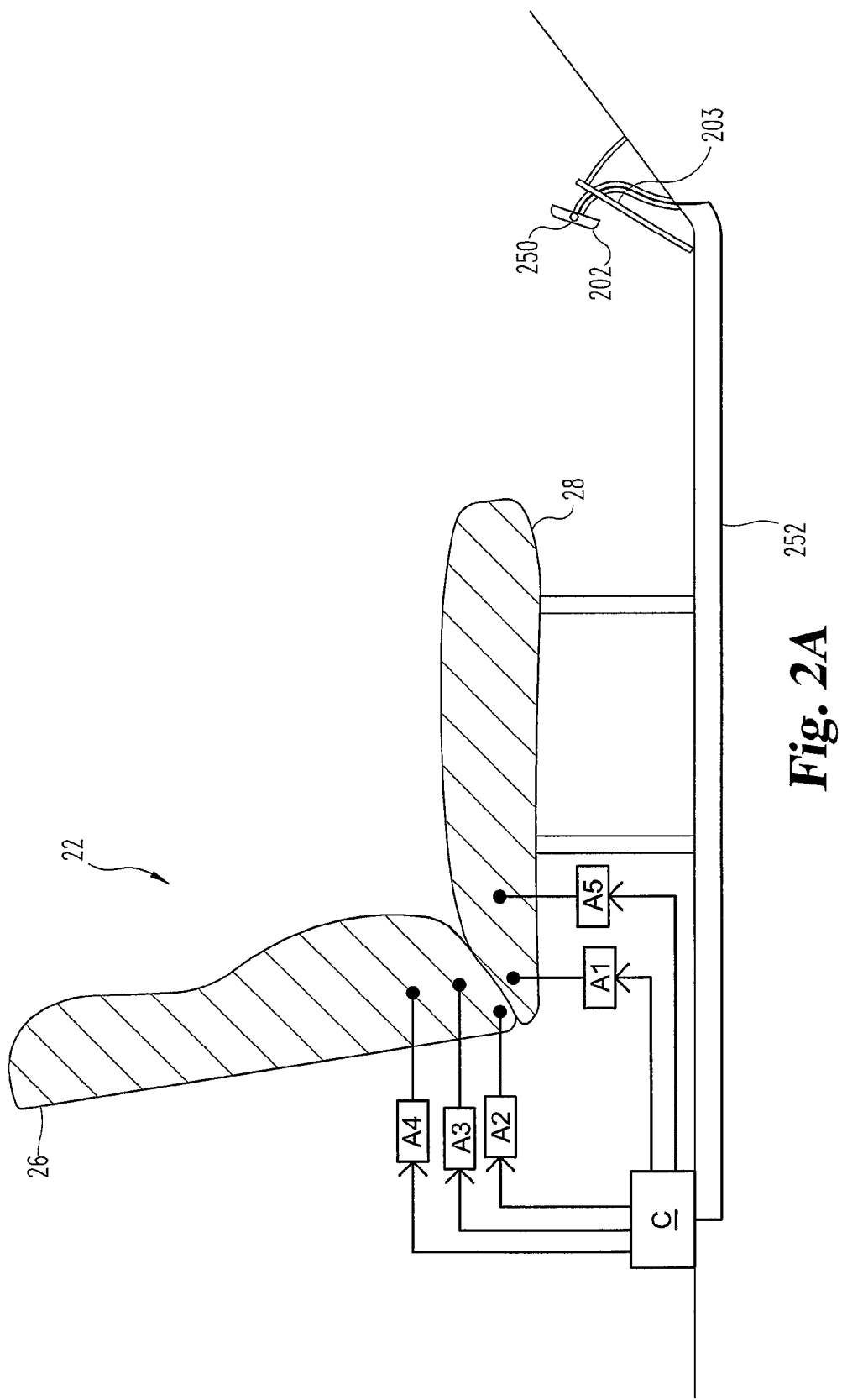

VEHICLE SEATING SYSTEM AND METHOD FOR REDUCING FATIGUE WITH CHANGING ACTUATOR MOVEMENT

FIELD OF THE DISCLOSURE

The present invention relates to vehicle seating systems and methods, and in particular, systems and methods for reducing positional fatigue and for suspending seat adjustment.

BACKGROUND OF THE DISCLOSURE

Vehicle passengers and drivers often experience various effects of traveling in a vehicle, and in particular, due to long distance traveling. Compressive forces on the bones and joints can cause muscle fatigue, muscle stiffness and other related problems resulting from a person's body being in a stationary position for relatively long periods. Additionally, pressure points can develop creating a medical condition known as ischemia. Ischemia is a restriction in blood supply, or in other words, an inadequate flow of blood to a part of the body, caused by the constriction or blockage of blood vessels. Relatively long periods of stationary positioning can cause ischemia to occur in various parts of the body producing patterns of discomfort, aches and pains. In response, a person naturally tends to change positions, even if only by a slight movement, impacting the person's circulation and restoring adequate blood flow to the affected area improving the person's comfort level.

The fatigue and stiffness experienced by different muscle groups, and the effects felt as a result of ischemia, while traveling can be problematic for a vehicle user. Many travelers often find themselves adjusting their body in the vehicle seat or adjusting various seat position adjustment actuators or therapeutic controls individually, attempting to achieve greater traveling comfort. Moreover, remaining in a stationary position for long periods of time can have various negative effects on a vehicle traveler's health, including the suspected chance of blood clot formation as well as various other ailments.

With or without some or all of those features, it can be beneficial to alter the nature of slow movement of a seat depending on driving conditions and/or locations (for example fast vs. slow; city vs. highway, or otherwise) by multiple modes of operation, various degrees of speed, frequency and/or amplitude, both, or otherwise.

There is a need for improved vehicle systems and methods. Certain embodiments address these and other needs.

SUMMARY OF THE DISCLOSURE

In one aspect of the present disclosure, a system comprises a vehicle seating system including a seat and at least one powered seat adjustment actuator for altering the seating position formed by the seat.

It is a vehicle system or method involving one or more seat adjustment actuators to slowly move the seat for reducing user fatigue, and includes changing between various movement frequencies and/or movement amplitudes based on at least one vehicle/user (typically a vehicle/operator or vehicle/driver) event.

The invention is set forth by the claims, and it is not limited by the foregoing.

It is an object of certain embodiments to provide an improved vehicle seating system and method.

DESCRIPTION OF THE DRAWINGS

FIG. 2A is a side, partial cross-sectional view of a vehicle seating system embodiment.

BRIEF DESCRIPTION OF THE ILLUSTRATED EMBODIMENTS

Figure 1A:
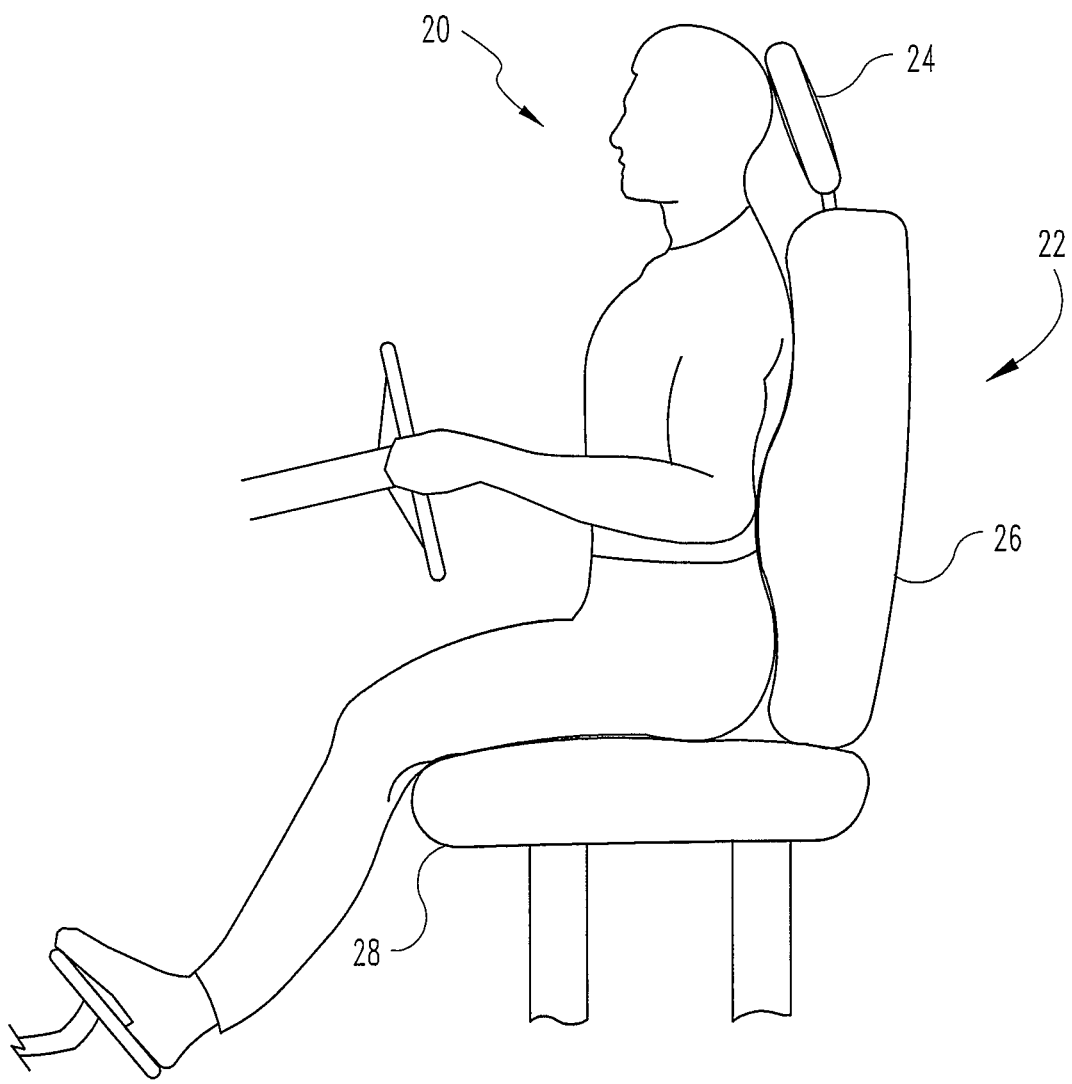
FIG. 1A is a side view of a vehicle seat and a user seated therein.

While the present disclosure may be embodied in many different forms, for the purpose of promoting an understanding of the principles of the disclosure, reference will now be made to the embodiments illustrated in the drawings and specific language will be used to describe the same. It will nevertheless be understood that no limitation of the scope of the disclosure is thereby intended. Any alterations and further modifications in the described embodiments, and any further applications of the principles of the disclosure as described herein are contemplated as would normally occur to one skilled in the art to which the disclosure relates.

Various embodiments of the system can be used within automobiles, trains, and/or airplanes, as examples.

The one or more actuators are moveable to alter the seating position formed by the seat, to provide comfort to the user and/or reduce positional fatigue and other effects of long distance traveling. The actuators may be independently activated by a user and/or may be automatically activated by the electrical controller. The following are hereby incorporated by reference: U.S. Pat. No. 7,422,285, U.S. Pat. No. 7,566,096, U.S. Patent Application Publication No. 2008/0091322 and U.S. Patent Application Publication No. 2009/0005938.

Regarding automatic activation, the actuators reposition the seat to different seating positions with a slow movement average of typically less than about 15 centimeters per second, and often less than about 10 centimeters per second. The electrical controller may have a control period which generally includes at least one movement period and, in certain embodiments, at least one stationary period. In certain embodiments, the electrical controller includes controlling software which may be initially activated by a user at a desired time to begin automatic movement of the actuators. Thereafter, the control period preferably includes at least one movement period where the actuators automatically move to alter the seat position of the seat (through one or more different seating positions) and reposition the user to reduce long distance traveling fatigue.

For general overview purposes, FIG. 1A illustrates a vehicle user 20 seated in a vehicular seat 22. A typical vehicular seat includes a head rest 24, a seat back 26, and a seat bottom 28. As illustrated in FIG. 1A, the user is operating a motor vehicle by using a typical steering wheel and pedal system. Additionally, the motor vehicle may include a typical vehicle braking system, such as system 200 (FIG. 2B) as an example.

Figure 2B:
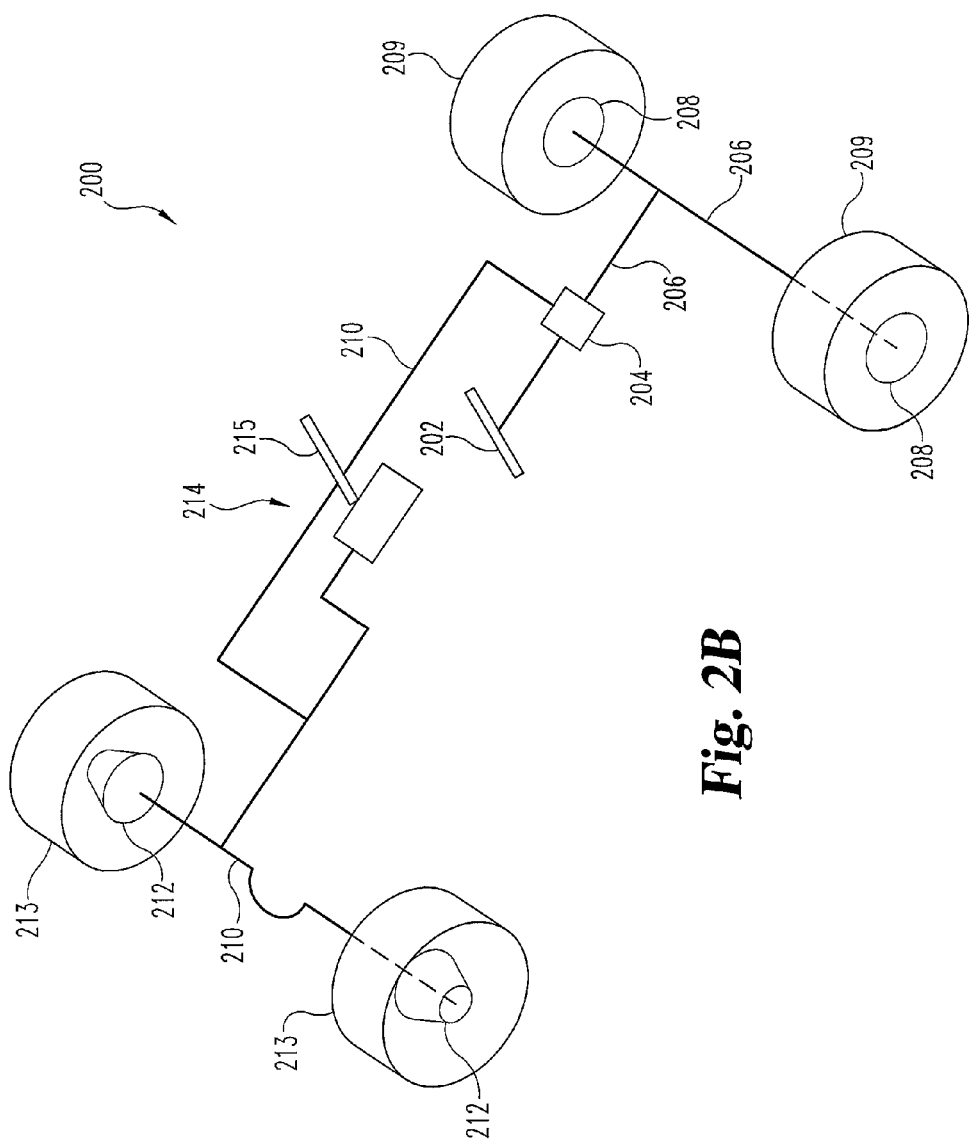
FIG. 2B is a perspective view of an example vehicle braking system.

As exemplified in FIGS. 2A and 2B, system 200 generally includes a brake pedal 202 leading to a master cylinder 204. Hydraulic lines 206 lead from master cylinder 204 to typical disc brakes 208. Upon a vehicle/user event, such as for example activation of vehicle braking system 200, disc brakes 208 operate in a typical fashion to stop the rotation of front wheels 209. Hydraulic line 210 leads from master cylinder 204 to typical drum brakes 212. Upon activation of vehicle braking system 200, drum brakes 212 operate in a typical fashion to stop the rotation of rear wheels 213. Generally, when a user depresses brake pedal 202, cylinder 204 transmits the force hydraulically through the fluid lines, and the brakes transmit the force to the tires using friction to stop rotation of the tires. For illustration purposes only, vehicle braking system 200 is shown with disc brakes associated with the front wheels and drum brakes associated with the rear wheels. It should be appreciated that the types of brakes used with vehicle braking system 200 could be any number of a variety of brakes used with the front and rear wheels.

In certain embodiments, vehicle braking system 200 further includes a typical emergency braking subsystem 214 having an emergency brake handle 215. In the illustrated embodiment, emergency brake handle 215 can be engaged by a user to apply the emergency braking subsystem to rear wheels 213. As with system 200, the illustrated subsystem 214 is only one example of numerous possible configurations of an emergency braking system.

Figure 21:
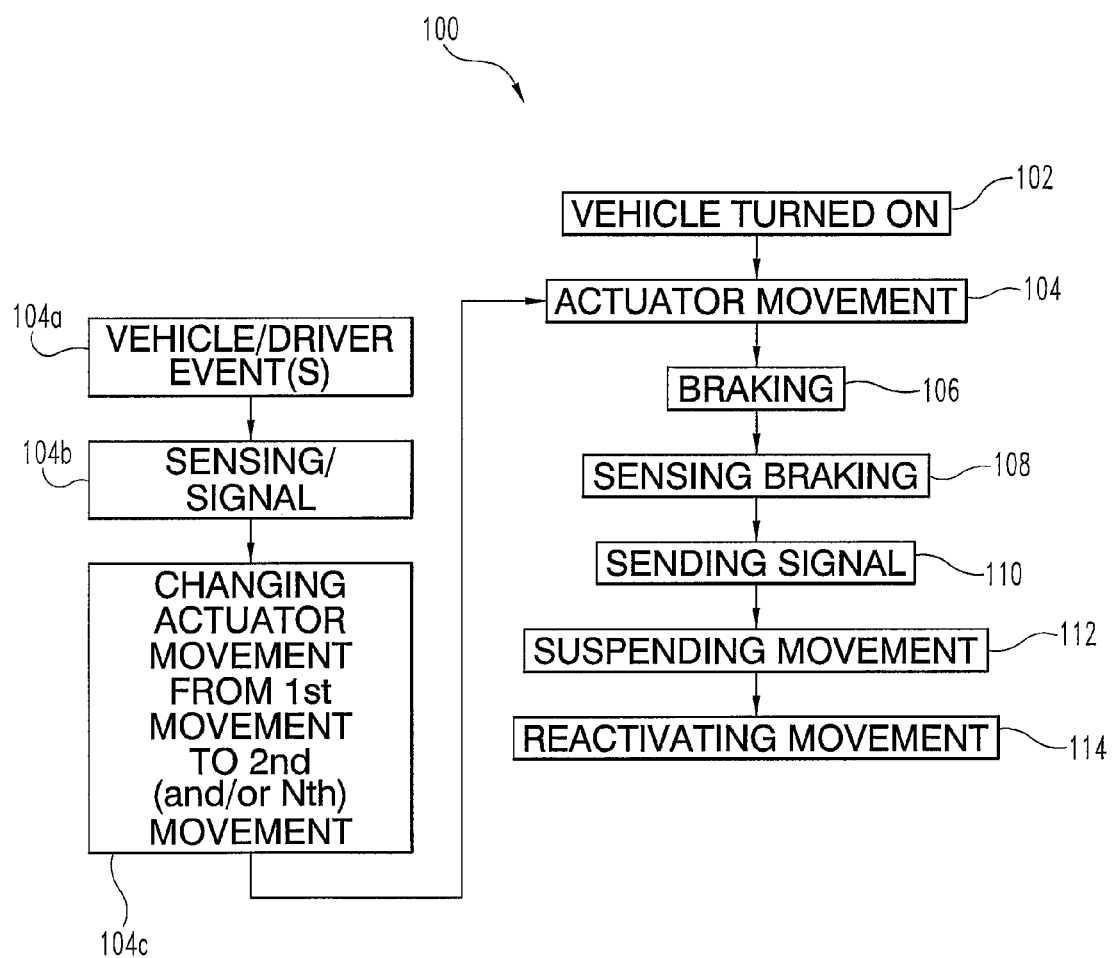
FIG. 21 is a flow diagram of a vehicle seating system according to an embodiment of the present disclosure.

Sensing activation of the vehicle braking system occurs at step 108 (FIG. 21). In certain embodiments, sensing application of the vehicle brakes involves the use of an actuator or sensor associated with the vehicle braking system to send a signal when the vehicle brakes are applied. It is contemplated that the sensor could be incorporated into the vehicle braking system at a number of different locations. With reference to vehicle braking system 200, the sensor or actuator could be associated with brake pedal 202, master cylinder 204, hydraulic lines 206 and/or 210, disc brakes 208 and/or drum brakes 212. Additionally, in certain embodiments, another actuator or sensor could be associated with emergency braking subsystem 214 to detect application of the emergency brake. As even further examples, the sensor or actuator could be associated with the smaller pistons (not shown) or the brake pads/shoes (not shown) used in connection with the disc and drum brakes.

In other embodiments, the sensor may be an optical sensor used to detect movement of a component of the vehicle braking system. As an example, an optical sensor may be used to detect movement of the brake pedal, such as brake pedal 202, to detect application of the vehicle brakes. In even other embodiments, the sensor may be associated with the brake lighting system of the vehicle, such that activation of the brake lighting system indicates application of the vehicle brakes. In yet other embodiments, the sensor may be a mechanical linkage component to detect application of the vehicle brakes. In yet other embodiments, brake sensors may include temperature sensors (of brakes, brake fluid, rotor, drum, pads or otherwise), or may include a vehicle accelerometer (or decellerometer) connected to the controller, whether such controller is part of a general vehicle microprocessor and/or a stand alone controller for the seating system. In such embodiments, the sensor may be engaged with the brake pedal, such that when a user depresses the brake pedal, the mechanical component activates a mechanical linkage system to suspend movement of the actuators. In another version, the sensor may be a computer software algorithm that senses any state in the vehicle's microprocessor(s) that corresponding with braking or deceleration. Such status in the microprocessor(s) may be initiated by one or more of the above-mentioned sensors, as well as vehicle velocity, deceleration, or the like.

In certain embodiments, a sensor or actuator, examples of which are described above, sends a signal at step 110 in response to activation of the vehicle braking system. It is contemplated that the signal could be sent in numerous possible ways. As an example, the signal may be an electrical signal sent from the sensor to an electrical unit which communicates with the actuators. In the example given above in which the sensor is a mechanical component, the signal could be sent via mechanical linkage to suspend movement of the actuators. In such embodiments, the mechanical linkage may be configured to contact a power switch to turn the actuators off. As yet another example, the signal may be sent from the sensor to a controller via a hydraulic pressure mechanism.

In typical embodiments, the signal travels along an electrical line (or by radio frequency) to an electrical controller operable to activate and suspend movement of the seat adjustment actuators. The electrical controller may be integrated into the vehicle's electrical system. In certain embodiments, the electrical controller discussed herein is the central electrical unit of the vehicle. Alternatively, the electrical controller may be an electrical unit designed specifically for activating and controlling the seat adjustment actuators. In certain other embodiments, the signal travels to specific seat adjustment actuators to suspend movement of the actuators.

FIG. 2A illustrates an embodiment of the present system in which vehicular seat 22 includes various seat adjustment actuators. The illustrated actuators A1-A5 may be automatically activated by electrical controller C to alter the seating position formed by seat 22 to reduce user positional fatigue, as will be explained in greater detail below. Additionally, FIG. 2A illustrates brake pedal 202, adjacent a gas pedal 203, to activate vehicle braking system 200 (see FIG. 2B). In the illustrated embodiment, a sensor 250 is positioned on brake pedal 202 and designed to produce an electrical signal in response to a user depressing brake pedal 203 to decelerate the vehicle. In such embodiments, the electrical signal travels along electrical line 252 to electrical controller C to suspend movement of the actuators during the critical event of braking. It should be appreciated that the example shown in FIG. 2A is merely one example of many different possible configurations for sending a signal in connection with step 110 (FIG. 21).

Figure 1B:
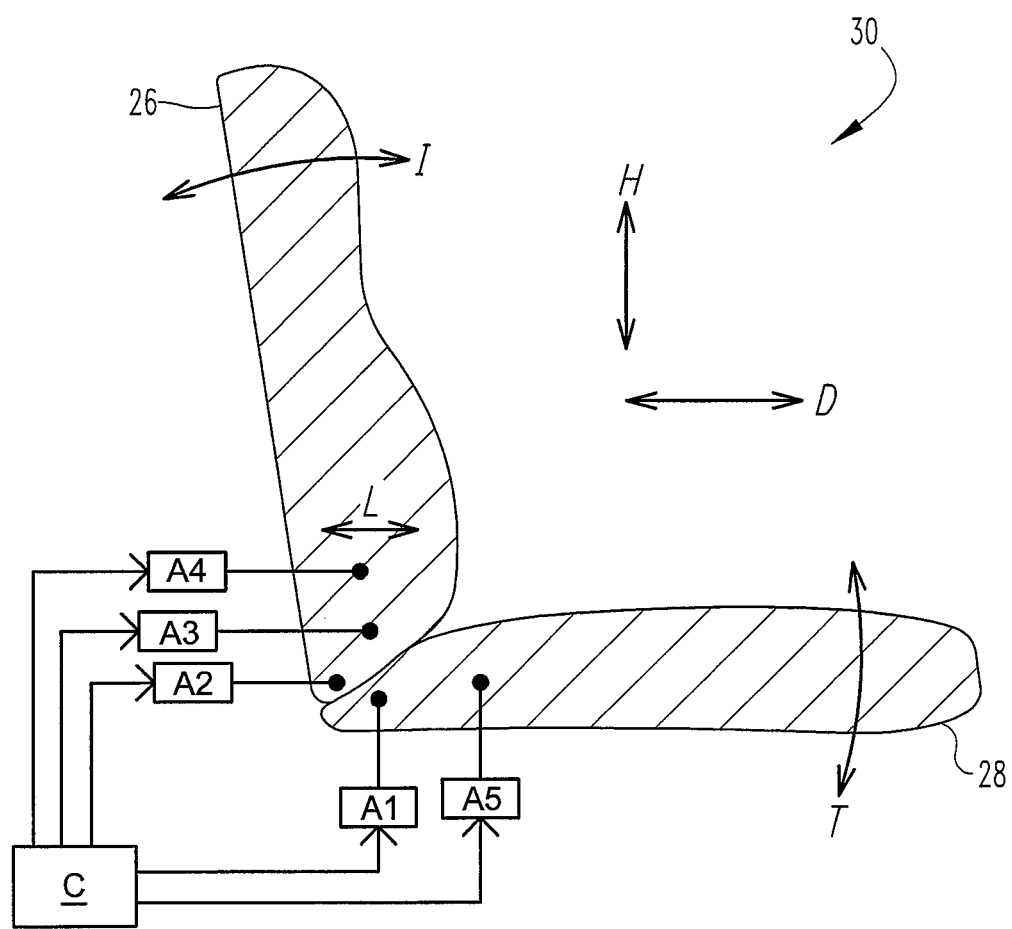
FIG. 1B is a side, partial cross-sectional view of a vehicle seating system embodiment.

FIG. 1B illustrates components of a vehicle seating system 30 designed to reduce user positional fatigue. It should be appreciated that the system can be associated with any type of vehicular seat. System 30 includes various powered seat adjustment actuators configured to move seat back 26 and seat bottom 28 in various manners, thereby altering the seating position formed by the seat. Certain typical embodiments include five actuators, such as a first actuator A1 to move both the seat back and the seat bottom in a generally vertical direction along a height axis H and a second actuator A2 to move both the seat back and the seat bottom in a generally horizontal direction along distance axis D. Movement along the distance axis D alters the distance that the seat is positioned relative to a steering wheel and pedal system for a driver's seat. A third actuator A3 is configured to move a lumbar region of the seat back along a lumbar axis L. A fourth actuator A4 and a fifth actuator A5 operate to incline or tilt the seat back along an I axis and the seat bottom along a T axis, respectively. The actuator power may be by motor, servo motor, stepper motor, pneumatics, hydraulics, or otherwise.

In certain embodiments, movement of the actuators includes a slow movement average of less than about 15 centimeters per second. In some embodiments, movement may be at a slow movement average of less than about 10 centimeters per second. In certain embodiments, each actuator moves from a first position to a second position, and cycling of the actuators includes movement from the first positions to the second positions and returning to the first positions. In some embodiments, the actuators occupy third and consecutive positions before returning to the first positions. In certain embodiments, the first position of each actuator is a base position and the second position of each actuator is the opposite, completely extended position of each actuator along the respective axis. However, in certain other embodiments, the first position of each actuator is a desired position, predetermined by the system or a user of the system.

System 30 generally includes an electrical controller C to automatically activate, operate, and cycle through the various actuators in a manner as to reduce positional fatigue. The electrical controller may operate in conjunction with a microprocessor and/or computer chip technology to operate the system. Additionally, the electrical controller may operate in conjunction with software technology to control automatic movement of the actuators. The electrical controller may include a control period. In certain embodiments, a user of the system may trigger a control mechanism to initiate the control period (and thus initiate automatic movement of the actuators) at a time desired by the user. In certain other embodiments, the electrical controller initiates the control period when the vehicle is turned on. In such cases, the control period may optionally include a first stationary time period before movement begins. In yet other embodiments, the electrical controller initiates the control period after passage of a first stationary time period beginning when the vehicle is turned on. In certain preferred embodiments, the first stationary period is about 20 minutes. In other preferred embodiments, the first stationary period is about 30 minutes. Further, it is contemplated that the control period can begin at other appropriate times as would generally occur to one skilled in the art.

In certain embodiments, the control period includes at least one fatigue period of at least ten minutes. In a preferred embodiment, the fatigue period includes at least one segment of time in which at least one actuator is moving to reposition the vehicle seat. In certain embodiments, the control period includes at least one movement period, including movement of at least one actuator, and optionally may include at least one stationary period in which the actuators are motionless. In certain embodiments, the stationary period is at least 5 minutes in duration. In certain embodiments, the control period ends when the vehicle is turned off.

As stated above, the electrical controller may be the central electrical unit of the vehicle's electrical system. In such situations, the electrical controller may be turned on when the vehicle is turned on, with a user of the system separately activating the controlling software, to initiate automatic movement of the actuators at a time desired by the user, by triggering a control mechanism linked with the electrical controller and the software. As an example, the control mechanism may include a button positioned on the vehicle's steering wheel or dash board area so that a user may activate and de-activate the automatic movement as desired. In other embodiments, the electrical controller may be a separate electrical component from the vehicle's central electrical unit, although electrically integrated into the vehicle's electrical system. In such cases, the electrical controller may be activated automatically when the vehicle is turned on and/or may be manually activated and de-activated by a user of the system. In the latter situation, a user of the system may manually switch the electrical controller on and off as desired. Additionally, in certain embodiments, the electrical controller is de-activated when the vehicle is turned off.

Figure 1C:
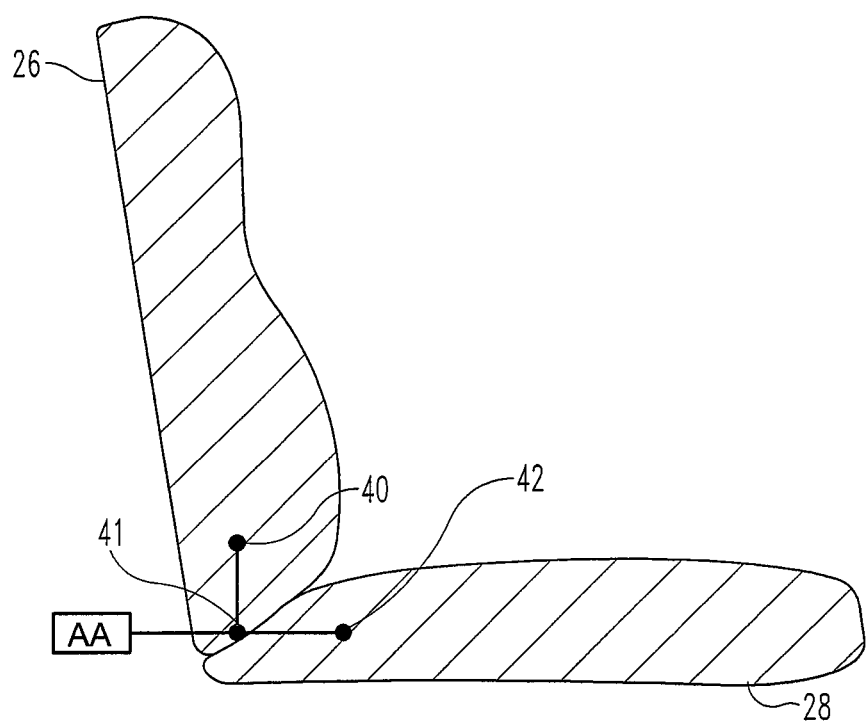
FIG. 1C is a side, partial cross-sectional view of a vehicle seating system embodiment.

FIG. 1C illustrates an alternative embodiment in which one actuating means AA, such as one power cylinder, is used to move the seat back and seat bottom to various seating positions through the use of various mechanical linkages such as bell cranks, worm gears, cams, etc. The actuating means AA and the mechanical linkages can be configured to cause movement at different actuating points, such as actuating points 40, 41, and 42, through the use of one actuating means. In other words, there may be one actuating means and more than one actuator at points 40, 41, and 42, for example. It is possible to link the actuators, as shown in FIG. 1C; however, in is often typical that the actuators operate independent of each other, as in FIG. 1B.

Figure 1D:
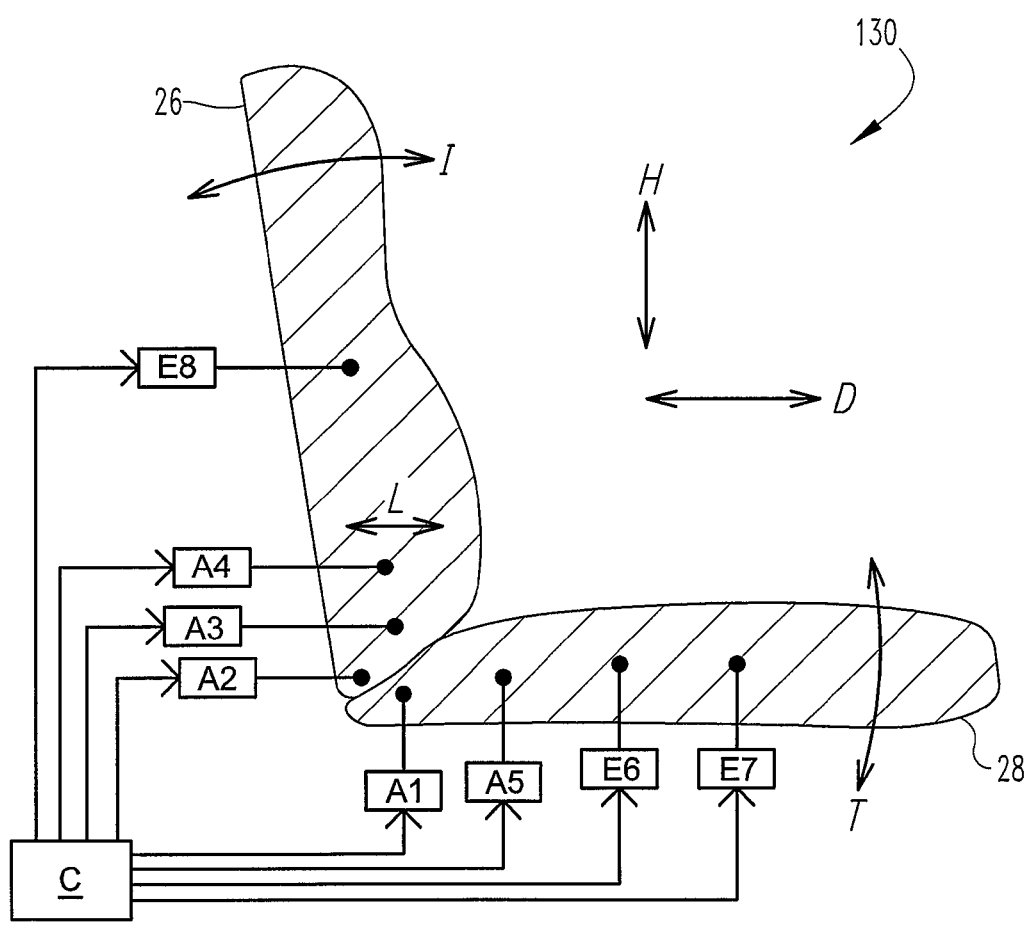
FIG. 1D is a side, partial cross-sectional view of a vehicle seating system embodiment.

Referring to FIG. 1D, components of a seating system 130, similar in design and function to system 30, are illustrated. System 130 is designed to also help with one or more of the following: reduce user positional fatigue, reduce the effects of ischemia experienced by a user of the system during long distance traveling, and provide comfort to a user of the system. It should be appreciated that the system can be associated with any type of seat, including vehicular seat 22 as an example. System 130 can include various members, including powered seat position-adjustment actuators configured to move seat back 26 and seat bottom 28 in various manners, thereby altering the seating position formed by the seat. In certain embodiments, system 130 can include one or more of the position-adjustment actuators described in conjunction with system 30, including actuators A1 through A5. As described above, actuator A1 can move the seat along height axis H, actuator A2 can move the seat along distance axis D, actuator A3 can provide lumbar movement along lumbar axis L, actuator A4 can tilt the seat back along axis I and actuator A5 can tilt the seat bottom along axis T.

Additionally, the members of system 130 can include one or more thermal energizers configured to adjust the seating temperature of the seat and impact the circulation of a user of the system. As examples, system 130 can include a heating energizer E6 configured to provide heat to the seat and a cooling energizer E7 configured to provide a cooling effect to the seat. Further, in addition to position-adjustment actuators, such as actuators A1 through A5, system 130 can include other mechanical energizers, such as a massaging energizer E8 configured to provide a provide a massaging effect to the seat. As another example, systems 30 and/or 130 can include a seat-extending member which extends the seat underneath a user's thighs. It is contemplated that other members could be part of system 130 and/or system 30.

As described above, movement of the position-adjustment actuators A1 through A5 preferably includes a slow movement average of less than about 15 centimeters per second, and in some cases, less than about 10 centimeters per second. Additionally, in certain embodiments, each actuator A1 through A5 and energizer E6 through E8 transitions from a first status to a second status, and cycling of the energizer members includes transitioning from the first statuses to the second statuses and returning to the first statuses. In certain embodiments, the first status of each position-adjustment actuator A1 through A5 is a base position and the second status of each position-adjustment actuator is the opposite, completely extended position of each actuator A1 through A5 along the respective axis. Additionally, in certain embodiments, the first status of each energizer E6 through E8 is the standard "off" setting, and the second status is the standard "on" setting. However, in certain other embodiments, the first status of each energizer member is a desired setting or position, predetermined by the system or a user of the system.

Similar to system 30, system 130 generally includes electrical controller C to automatically activate, operate, and/or cycle through the various energizer members in a manner as to reduce positional fatigue, impact a user's circulation, and reduce the effects of ischemia. The electrical controller C may operate as described above in connection with system 30, including having a control period with stationary or hold periods, and movement or activation periods. In certain embodiments, massaging energizer E8 may include the use and operation of electronically controlled massage therapy systems. As an example, energizer E8 can include inflatable and deflatable gas or fluid chambers operable to provide a massaging effect through the seat back of the vehicle seat. In certain embodiments, energizer E8 can provide a vibratory massaging effect. Additionally, in certain embodiments, energizer E8 can provide a rolling massaging effect traveling up and down the seat back of the vehicle seat, such as through the use of a rolling cam. Regarding the thermal energizers, heating and cooling energizers E6 and E7 may include the use and operation of conductive fluid to provide the desired thermal effect. Additionally, heating energizer E6 may include the user and operation of one or more electrical elements to provide heat to the vehicle seat.

Optionally, the actuators may cause movement at two or more speeds. For example, the actuators may cause movement at a first, lower speed for purposes of reducing or preventing fatigue, and have a second, higher speed for the user to adjust the position of the seat manually or through known seat memory position features. This allows for the seat to be changed to the preferred (typically starting) seat position relatively quickly. Such multi-speed actuators may come in a variety of forms. For example, they could include conventional brushless electrical motors, other electrical motors which are multi-speed (e.g., with two speeds, three speeds, or more speeds), and such multi-speed motors could include stepper motors and/or servo motors previously discussed. The controller would send a control signal to the motor (or other actuator) to use the higher speed, such as one button or other control, to manually or memory adjust the seat as activated, and send a signal for a slower motion for seat movement in connection with the anti-fatigue function. Such slower motion, has the benefit of being less discernable by the driver and/or less likely to surprise or startle a driver during its operation. Alternatively, such optional multi-speed actuators may also include multi-speed hydraulic and/or pneumatic actuators as previously discussed, with the rate of movement preferably controlled by valving and/or inflation/deflation rates.

Referring to FIGS. 3A-6B, various examples of optional movement profiles are illustrated. These are merely samples, and numerous others are possible as well. They depict time on the horizontal axis (or x-axis) and movement amplitude on the vertical axis (or y-axis). For example, these FIGS. 3A-6B, which are drawn to scale, depict examples showing minutes, including decimal fractions of minutes. For example, 0.33 minutes equals 20 seconds. The displacement may be in terms of length (linear and/or curvilinear or otherwise) and/or in terms of angular displacement, measured in terms of angles, stepper or servo motor position, or otherwise. Displacement is synonymous with amplitude, and amplitude need not be cyclical. For purposes of illustration, such displacement is depicted as having positive and negative numbers, thereby denoting that dead center is at a zero ("0") displacement value. Of course, this could be expressed as all positive numbers, all negative numbers, or otherwise.

Figure 3A:
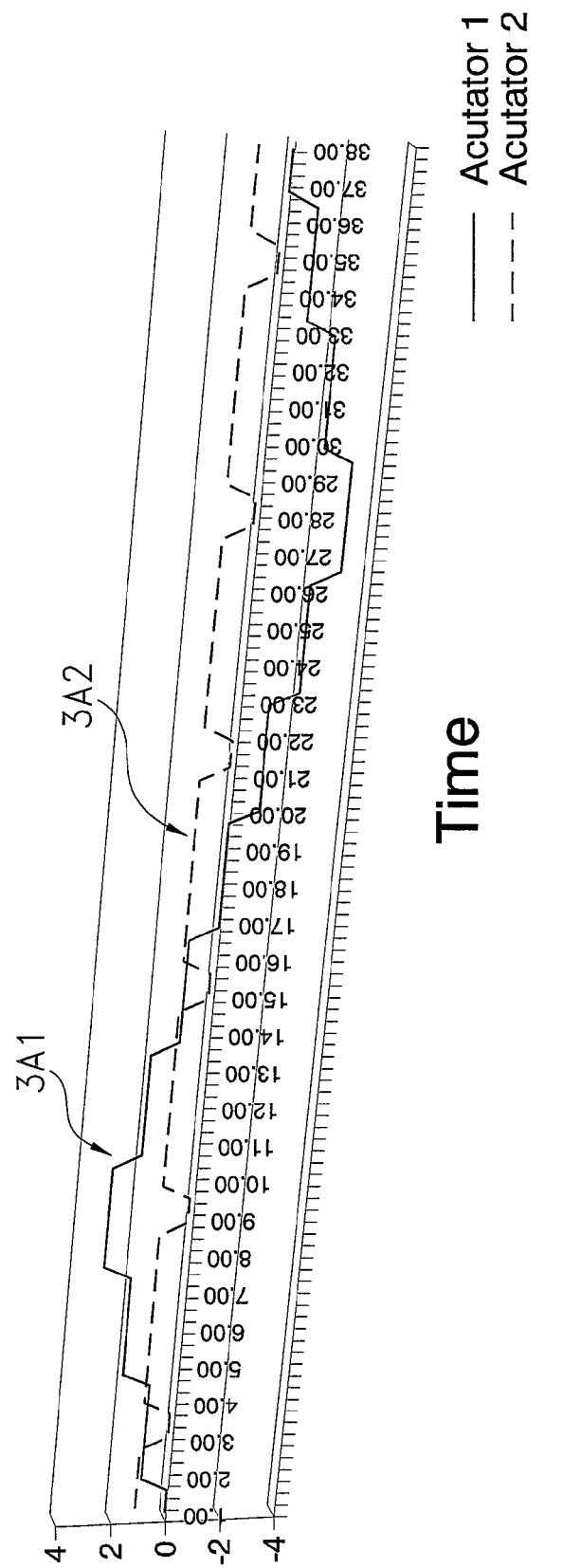
FIG. 3A is one example of two actuator movement profiles in a first mode.

FIG. 3A depicts movement profiles of actuator 1 (3A1) and actuator 2 (3A2) along a time axis and displacement axis. Such actuators may, be any of the actuators previously described, and/or may include more or less actuators. As illustrated, actuator 3A1 is shown as a series of steps depicted by horizontal stationary periods and upwardly sloping and/or downwardly sloping movement. In this particular example, for example, movement is depicted as cyclical from a peak of +3 to a peak of −3. Other profiles, cyclical or non-cyclical or both, may be used as well. Profile 3A2 of actuator 2 is shown as being more of a back and forth with longer and shorter stationary periods between the 0 position and the 1 position of displacement. For example, FIG. 3A may depict movement of actuator 3A1 corresponding to the inclining I of seat back 26 (see FIG. 1B, FIG. 1D, for example). Movement profile 3A2 may, correspond to lumbar movement L (see, for example, FIG. 1B and/or FIG. 1D). Of course, such actuators may correspond to seat bottom tilting T, and/or adjustment H and/or D, or otherwise.

Figure 3B:
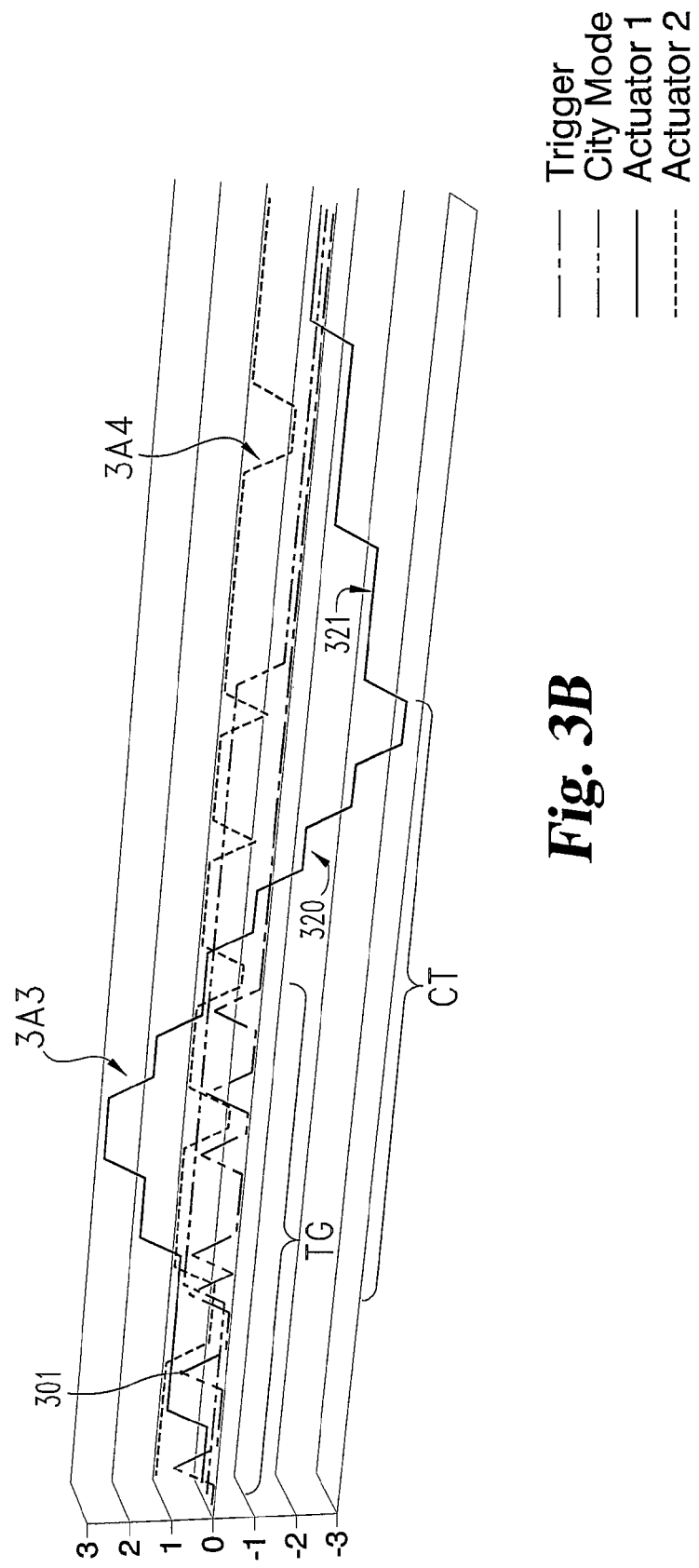
FIG. 3B is one example of two actuator movement profiles in a second mode.

FIG. 3B, in comparison and in contrast to FIG. 3A, shows a changing of the seat movement. For example, seat movement 3A1 of FIG. 3A may be altered to a different profile, depicted as profile as 3A3 shown in FIG. 3B. Similarly, by comparison, movement profile 3A2 (FIG. 3A) may be changed to movement profile 3A4 (FIG. 3B). Such changing may be in response to a vehicle/user event while the vehicle is moving (and/or in drive and thus typically moving). For example, with reference to FIG. 3B, there may be one or more vehicle/user event or triggering events depicted at TG. Such triggering events may be a single event, a combination of events, or a result or results of a computed outcome or value. For example, as illustrated in FIG. 3B, a series of spikes are illustrated on the trigger plot such as at 301. In the particular example, seven such trigger events are illustrated, although more or less and/or other trigger events may be utilized. In such a case, upon sensing such vehicle-driver event, the controller C may alter the movement of the seat actuators and/or seat movement profiles. For example, as shown in FIG. 3B, this is shown as "city mode", depicted therein as the binary status, namely either in city mode or not in city mode. For example, this may be expressed in terms of a highway mode or a city mode. However, the system is not limited to binary statuses, but may include 3, 4 or more statuses or modes and/or hybrid of modes. Moreover, they also may include a sliding scale or gradient transition or change of status, such as with coefficient indicating a degree of change (e.g. frequency and/or amplitude) and being multiplied by a frequency value, an amplitude value, both or otherwise. Also, a change of movement may be a change in actuator speed, and corresponding seat movement speed, which comprises both a change of frequency and amplitude for that time segment. Note that before city mode CT, the movement profiles are a first status corresponding to FIG. 3A, but during city mode CT, they move to a second movement profile. However, after the conclusion of city mode CT, they change to another mode, in this example reverting back to the original movement profiles 3A1 and 3A2, as shown in FIG. 3A. For example, in FIG. 3B, movement profile 3A3 shows a higher frequency movement, as depicted in the shorter duration stationary period 320, as compared to the longer duration stationary period 321. The longer stationary period 321 may, for example, correspond to a highway (or other) mode or status. Thus, for example, when the vehicle operating as depicted in FIG. 3B transitions from a highway mode to city mode CT, the average movement frequency increases, and after the city mode the movement profile changes to a lower frequency movement.

Figure 4:
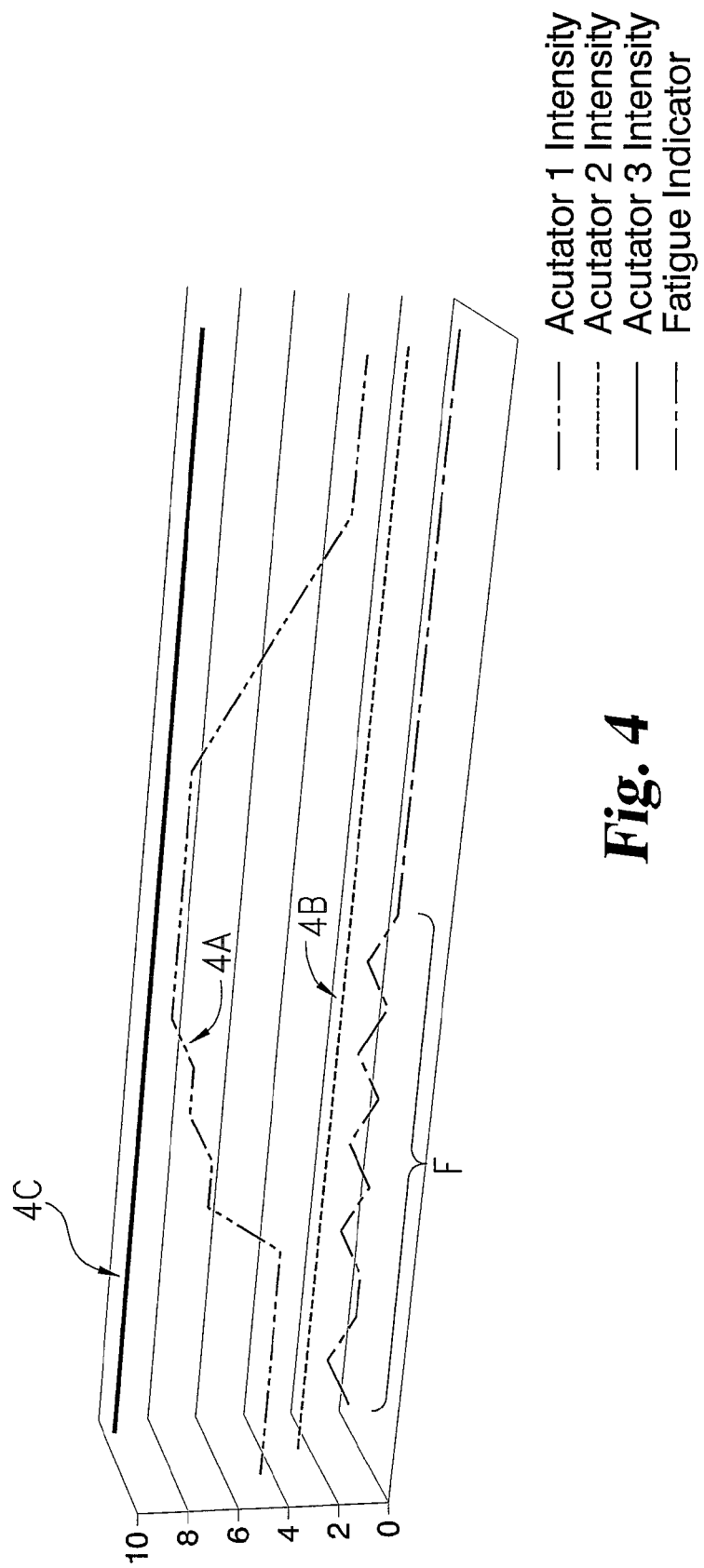
FIG. 4 is a profile of one example of variable actuator speed.

FIG. 4 illustrates several optional attributes that may be included, or not included, in connection with the features claimed. FIG. 4 likewise shows on the horizontal axis time, and a value figure on the vertical axis. FIG. 4 is expressed in terms of "intensity" which normally means speed, but may also be expressed in terms of force or displacement, or a combination thereof. FIG. 4 depicts actuator 1 intensity (4A), actuator 2 intensity (4B) and actuator 3 intensity (4C) plotted as a function of time. Note that actuator intensity 4A may be variable as a function of time. Actuator intensity 4B has a lower value, but is otherwise constant, and actuator 4C is at a higher intensity value, but likewise is constant. With regard to variable actuator intensity, such as variable actuator speed, this optional feature may be utilized in connection with and/or in response to one or more inputs. For example, instead of or in addition to, or along with, frequency variations of movement profile be a function of stationary time, they also may be a function of actuator speed. Thus, for example, transitioning to or from highway mode and/or city mode, or other modes, actuator intensity may be adjusted in response to various vehicle/user events described elsewhere. Another feature, not unique to the present system as a stand alone feature, but nevertheless optionally includable, is a shake-to-wake feature in which actuators are used to vibrate or jolt or alert a driver if the system senses fatigue, such as a driver dozing off. Such fatigue indication F (see FIG. 4) is depicted as spikes corresponding to sense fatigue input, as is known elsewhere, such as discerning eye movement patterns, drifting off the road, speed fluctuations, time of day and/or driving conditions (e.g., late night) that give an indication, or at least a probabilistic indication, of driver fatigue and/or dozing off. In such case, in addition to the long term fatigue reduction of the present invention, such prior art shake-to-wake features may optionally be included in combination with some or all of the claimed features of the present system. They may trigger shaking via actuators and/or audible and/or visual alarms.

Optionally, actuator speed may be altered mid-move as being a change of frequency and amplitude (at least for that movement segment) as previously discussed. Moreover, optionally actuator speed may be higher at first, such as a burst of power to a motor to get it moving (or to get it unstuck) followed by the motor moving at a slower speed(s).

Figure 5A:
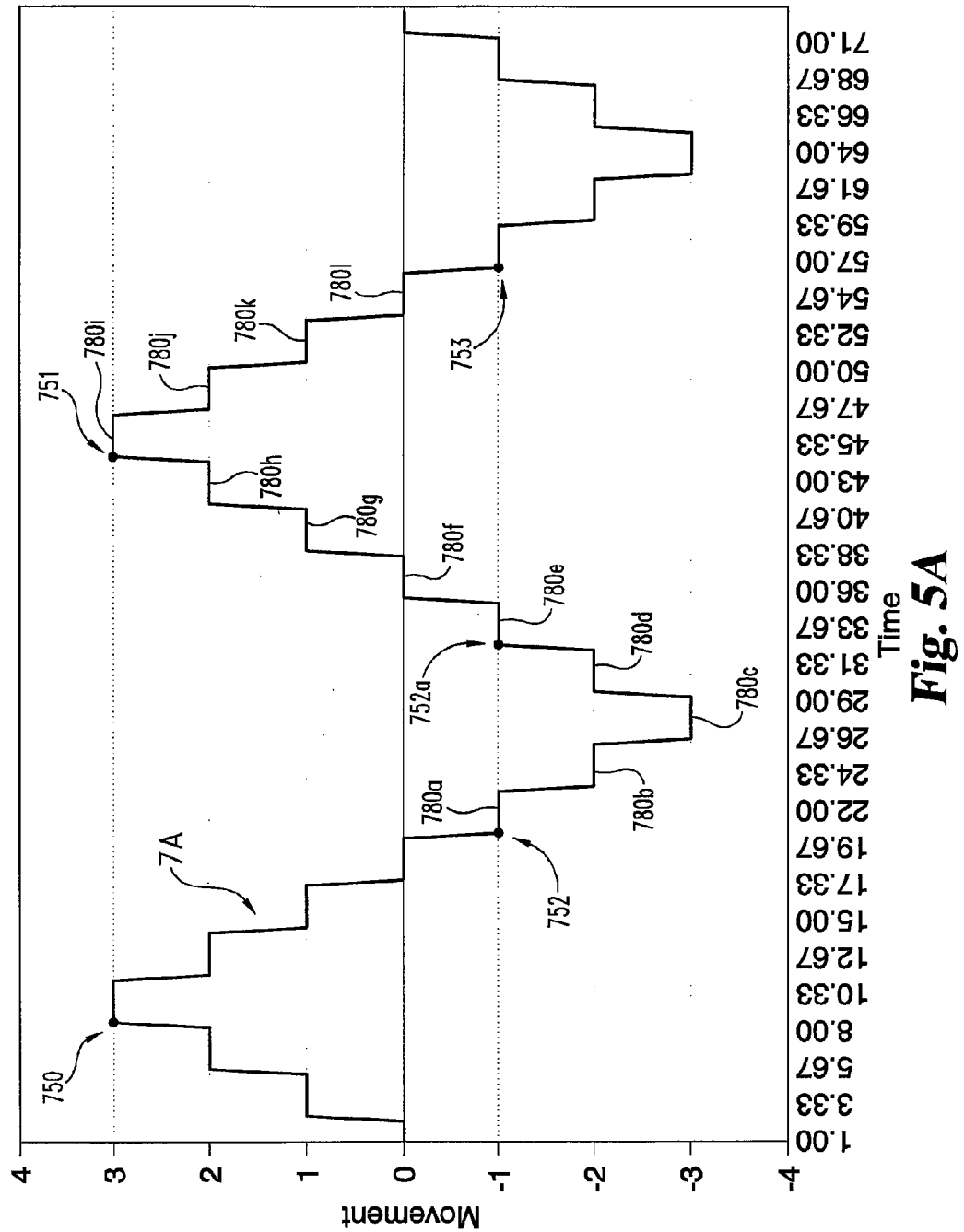
FIG. 5A is one example of an actuator movement profile.
Figure 5B:
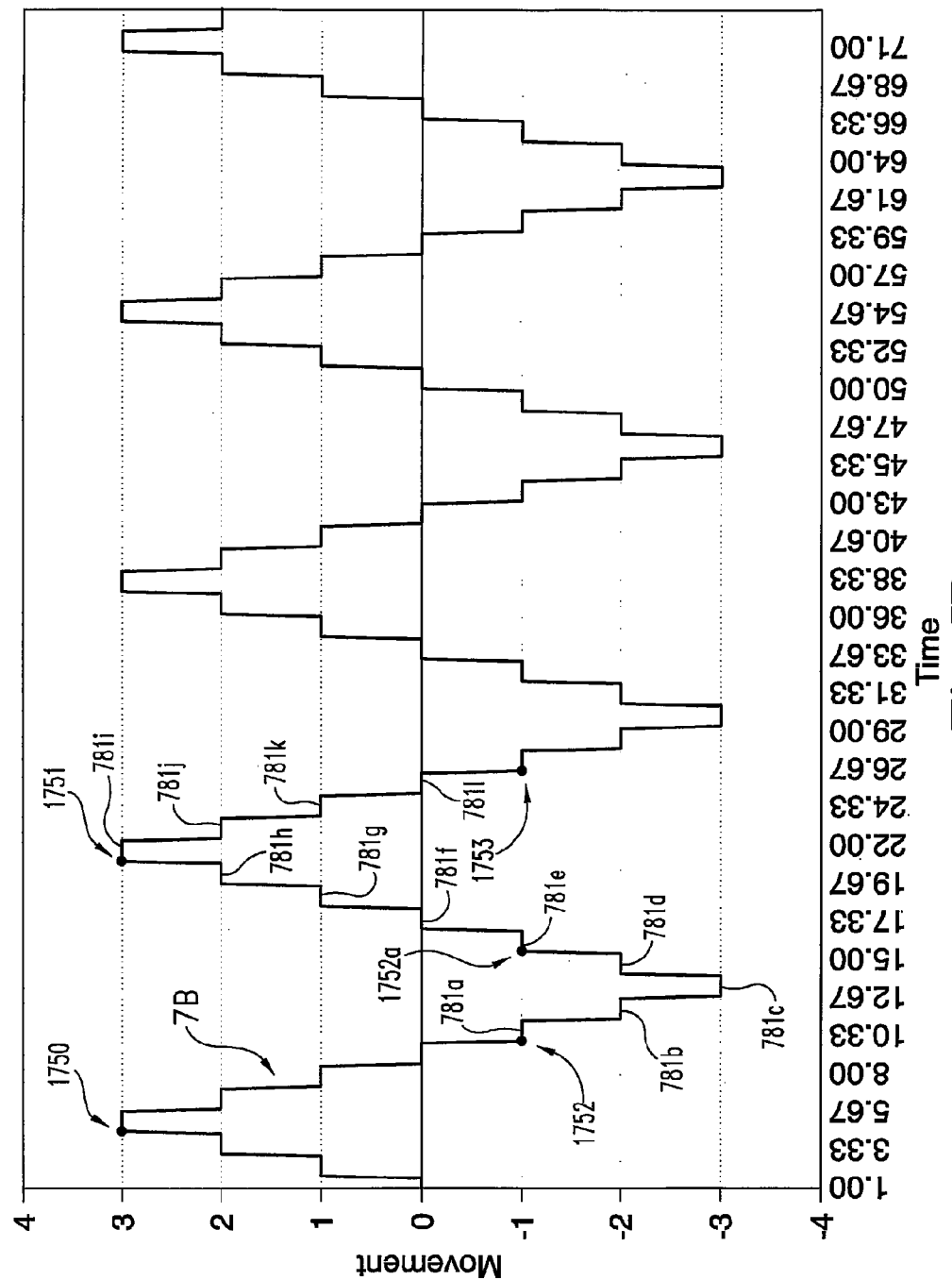
FIGS. 5B-5E are variations of an actuator movement profile as compared to FIG. 5A.

FIGS. 5A-5E illustrate merely examples of possible movement profiles. For comparative illustration, the profile in FIG. 5A can be thought of as the starting point, default, or baseline profile, with the other profiles being variations thereof. However, the other profiles may be considered such default profiles as well (see for example, FIGS. 7-19). By way of examples, FIGS. 5A-5E show the time along the x-axis depicted in minutes, including fractions of minutes. They may be expressed in seconds or otherwise. This is drawn to scale, although optionally other time intervals may be used as well. Likewise, the y axis the movement displacement is shown in relative values, positive and negative. FIG. 5A depicts a generally cyclical, approximately sinusoidal, cycle pattern for movement about the "Y=0" axis. It is shown as a stair step, although it may be rounded curves or multiple slopes as well. Movement profile 7A is illustrated with series of stationary periods. For examples, stationary periods 780a, 780b, 780c, 780d, 780e, 780f, 780g, 780h, 780i, 780j, 780k and 780l are illustrated. Example positions are illustrated, such as position 750 and position 751. For example, position 750 is shown at the positive peak displacement (+3), and the average movement frequencies are the time between the first position 750 through one or more second positions displaced from 750, (e.g., between 750 and position 751) and back to first position as 751. In other words, the movement from position 750 to 751 cycles through positive and negative displacement locations over a period of time with position 751 be in the same position as 750 albeit at a later time. The average movement frequency is the period of time (distance on the horizontal x axis) between position 750 and 751. However, note that such time between first position to a second position and back to the first position need not necessarily be at a peak or apex of a movement cycle. For example, this time value also may be measured by comparing position 752 to position 752A, and again to position 753 in FIG. 5A. In all three such positions, the displacement of the given actuator is at the same position (namely, a value of negative 1 in FIG. 5A). However, the time between such positions is shorter as between position 752 and 752A than it is between position 752A and 753. However, the average movement frequency would, in this example, average the lesser time (752 to 752A) and the greater time period (752A to 753). Thus, by comparing FIG. 5A with FIG. 5B, one example of changing the actuator, and hence seat portion movement, is changed. FIG. 5B is substantially the same as FIG. 5A except that the cyclical motion happens at a higher frequency. Thus, position 1750 and position 1751 are closer together in terms of time, reflecting a higher frequency. Likewise, position 1752, 1752a, and 1753 are closer together than their counterparts (752, 752A, and 753 in FIG. 5A) both individually and by averaging both values. Thus for example, the controller may be adapted for receiving at least one signal based on at least one vehicle/user event while the vehicle is moving, and changing the seat actuator movement (and hence the corresponding seat back, seat bottom, lumbar support, seat height, etc.) movement from the first average movement frequency 7A (FIG. 5A) to a second higher average movement frequency 7B (FIG. 5B) based at least in part on the signal. Such signal may be one or more of combination discussed elsewhere, including but not limited to transitioning from highway driving to slower, non-highway driving. Other examples may be used as well. These could include (a) night driving vs. day driving; (b) relatively straight driving vs. numerous turns; (c) level driving vs. uphill/downhill driving; (d) sleepy vs. non-sleepy; (e) driver identity, combination(s) thereof, and/or otherwise.

Figure 5C:
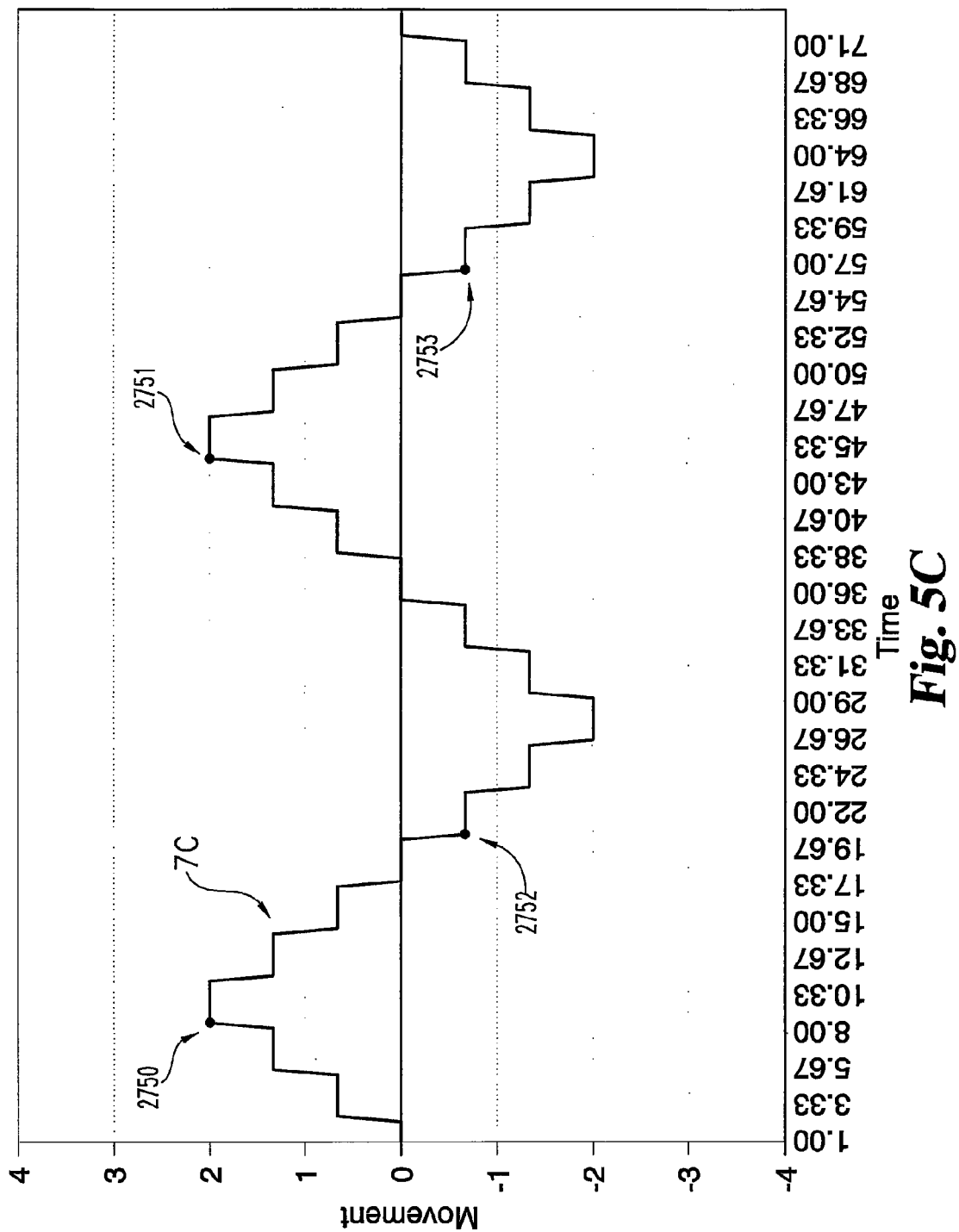

Comparing FIG. 5C to FIG. 5A (and/or to FIG. 5B) it can be seen that rather than altering the frequency, the average frequency remains the same, but the amplitude of movement has been reduced by some amount. In the illustrated embodiment, drawn to scale, FIG. 5C's amplitude is reduced by a coefficient of ⅔ (or 0.666). Thus, for example the peak positive displacement in FIG. 5C is 2, whereas the peak positive displacement is in FIG. 5A is 3 in relative terms. Thus, the vertical distance between location 2750 and location 2752 is reduced as compared to location 750 and location 752. The average frequency in this illustrated embodiment of FIG. 5C between 2750 and location 2752, as well as between location 2752 and location 2751, as compared to the corresponding locations (750, 752 and 751) in FIG. 5A is the same in this example. Thus, as with FIG. 5B, rather than altering the frequency, one may change the amplitude. Of course, the current system can be set up to do one or both, increase and/or decrease frequency and/or increase and/or decrease amplitude, alone or together.

Figure 5D:
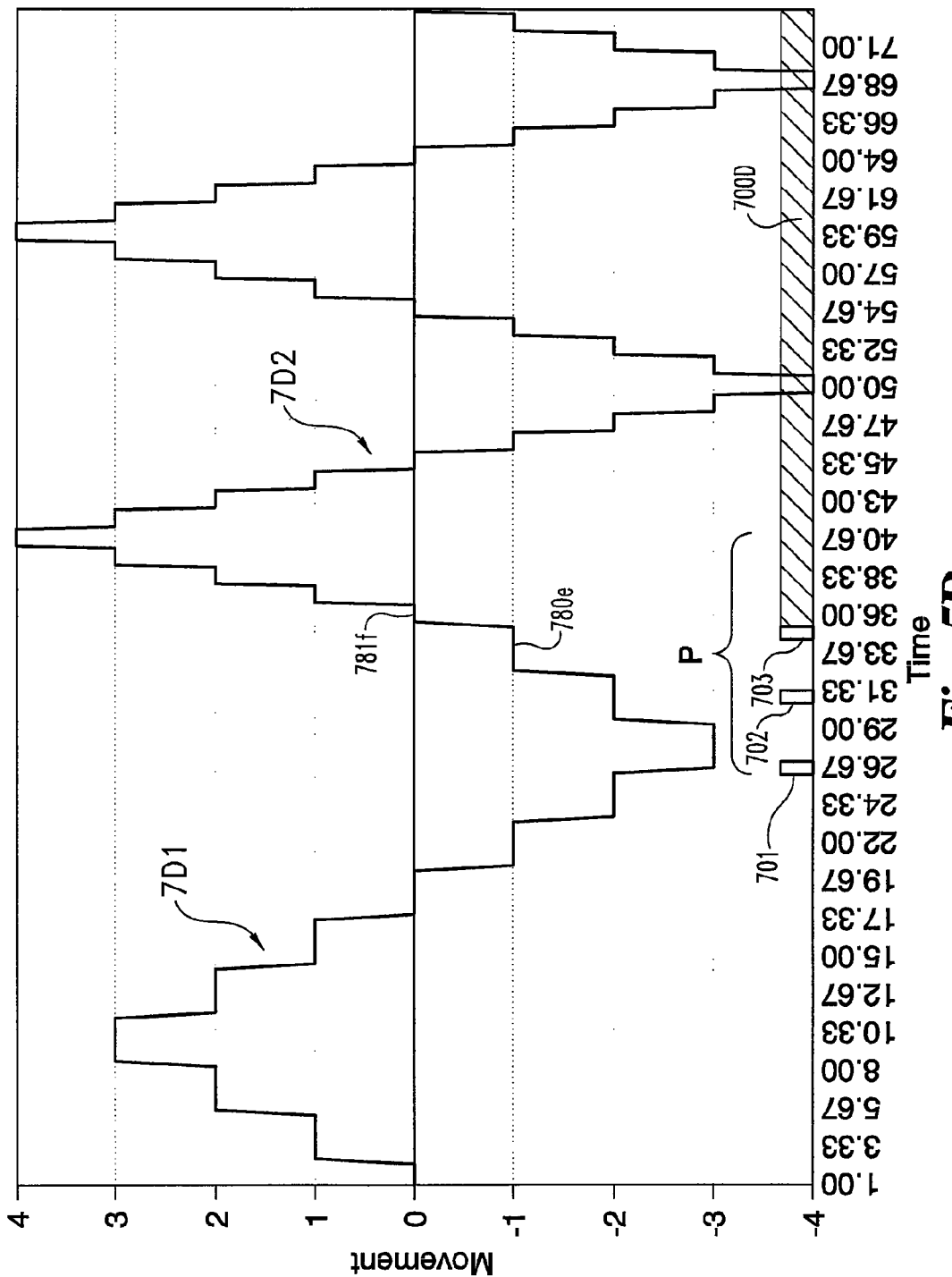

FIG. 5D illustrates actuator/seat movement profiles 7D1 followed by profile 7D2. The transition from profile 7D1 to profile 7D2 is caused or triggered by one or more vehicle/user events, such as events 701, 702 and/or 703. These may, for example, happen within a predetermined time period P. Under this one example, once three such events occur within time period P, the controller, sensing this, sends a control signal during second mode depicted as shading at mode 700D. During such second mode, the actuator movement is changed. In this particular depicted example, the amplitude increases and the frequency increases as illustrated. For example, a stationary period 781*f* is lesser or shorter than stationary period 780*e*. The second mode 700*d* continues until some predetermined time and/or until one or more predetermined vehicle/user event(s) or combination thereof, as illustrated in FIG. 5D.

Figure 5E:
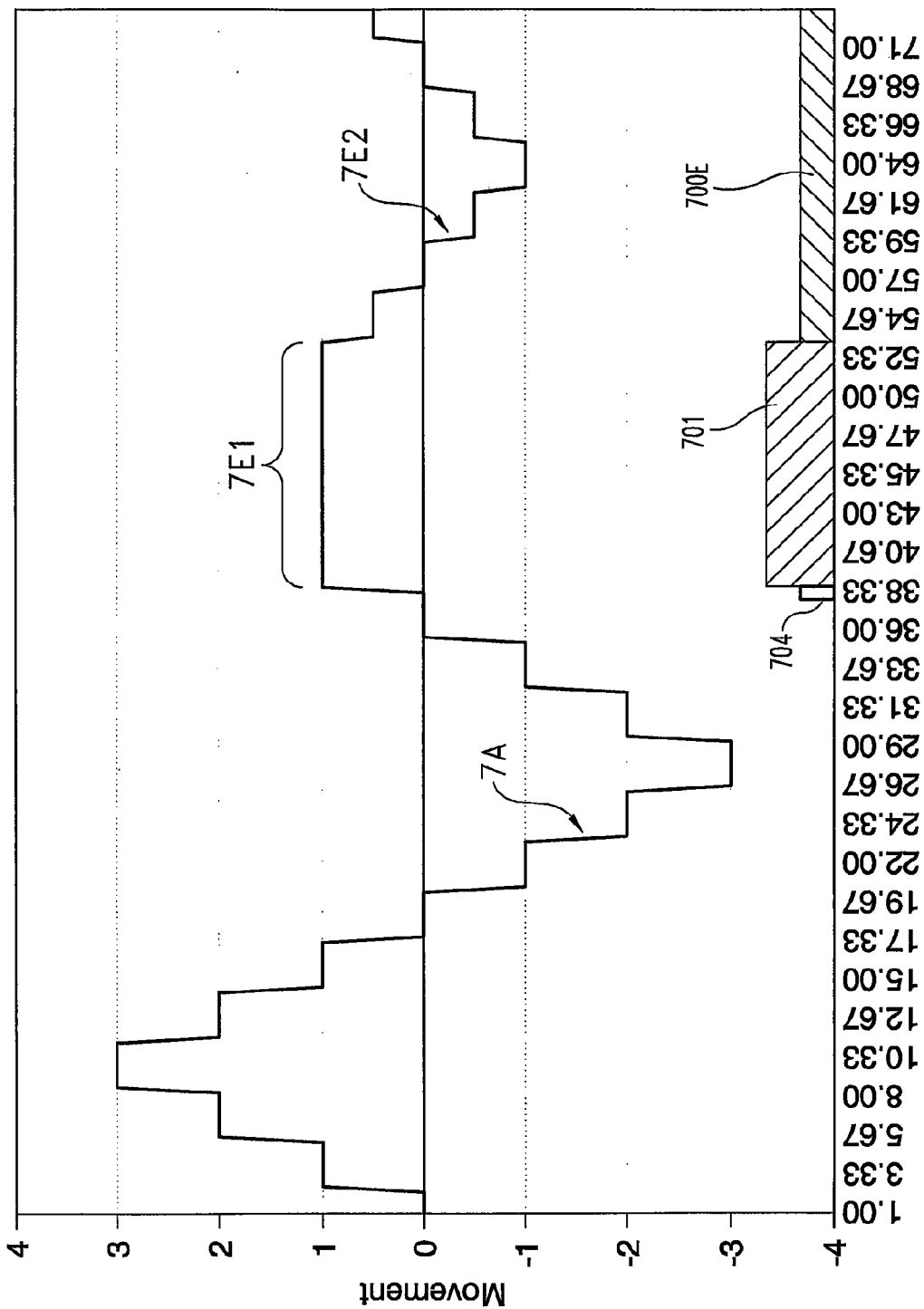

FIG. 5E illustrates another variation profile 7A (discussed in connection with FIG. 5A). As shown in FIG. 5E, a single vehicle/user event 704 may, optionally, cause a suspended mode 701. The suspended mode is an optional feature, and corresponds with a lack of change of motion depicted at regions 7E1. This feature is described further elsewhere including in connection with 106, 108, 110, 112 and 114 in FIG. 21. Additionally and/or instead of this, the vehicle system may go into a second mode 700E, changing the profile at 7E2 as illustrated. In such mode, the frequency may be the same or changed, and as illustrated the amplitude is reduced such as for example, as discussed in connection with the examples of FIGS. 5A-5D.

One optional set of seat movements can be as follows. The seat back 26 incline movement I is back and forth, generally cyclical with stationary periods. For example, the seat back may move incline I between −3° to +3°, with negative being back and positive being forward from a starting 0° position. The seat bottom 28 may be different. When the seat back 26 is in a position forward (+3°) of where it started, the seat bottom moves between 0° and +1°, (with positive being up tilt T). This may be done while the seat back 26 is stationary or moving. As one example, while seat back 26 is moving, in the time the seat back takes to move from 0° to +3° to 0°, the seat pan has moved from 0° to +1° back to 0° three times, when the angular speeds are the same. And, in this example, once the seat back is moved behind its starting point towards −3°, the seat bottom oscillates between 0° and −1° (down), again three times per the seat back's single cycle. Of course, these ratios may optionally be otherwise, and this is merely on example of relative movement of the seat back and the seat bottom. Likewise, the values of 3 degrees and 1 degree as set forth and the values may be greater and/or lesser.

It is to be understood that FIGS. 5A-5E, like the other figures, are merely examples, they may be curvilinear, have various slopes and lengths, and other shapes. Moreover, for drawing simplicity they only depict the movement of a single actuator and/or seat portion moved by that actuator. However, it is to be understood that one more such profiles may be overlaid with each other in synchronization or counter motion or otherwise. Examples of such overlay of multiple actuators and multiple profiles include those set forth in drawing FIGS. 7-17, discussed further below. Thus, for example, the profiling transitions of FIG. 5D may be applicable to a seat back, whereas a profiling motions of FIG. 5E may be applicable to an actuator for a seat bottom, or vice versa. The same is true with the other drawing figures and are merely non-limiting examples.

Figure 6A:
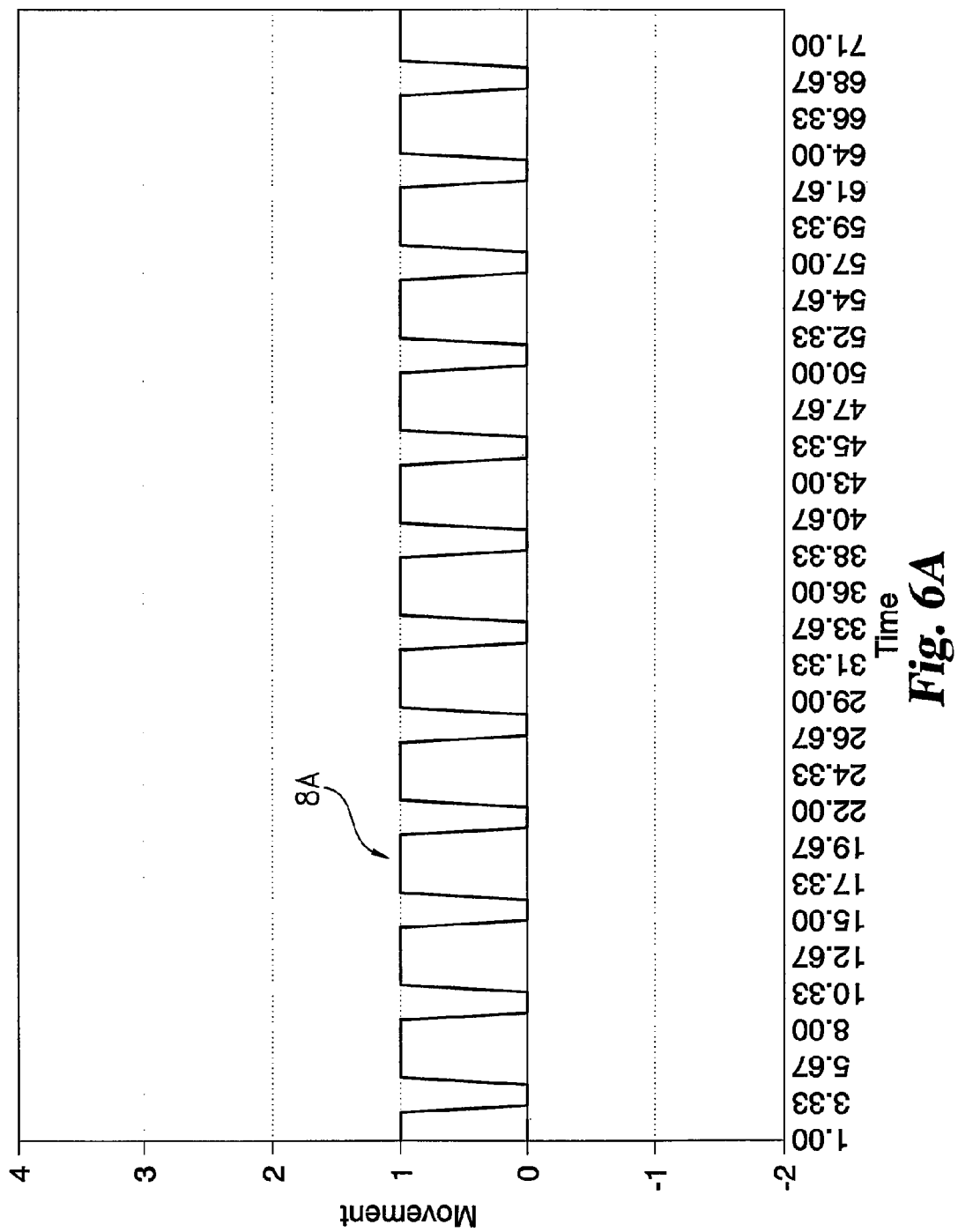
FIG. 6A is another example of an actuator movement profile.
Figure 6B:
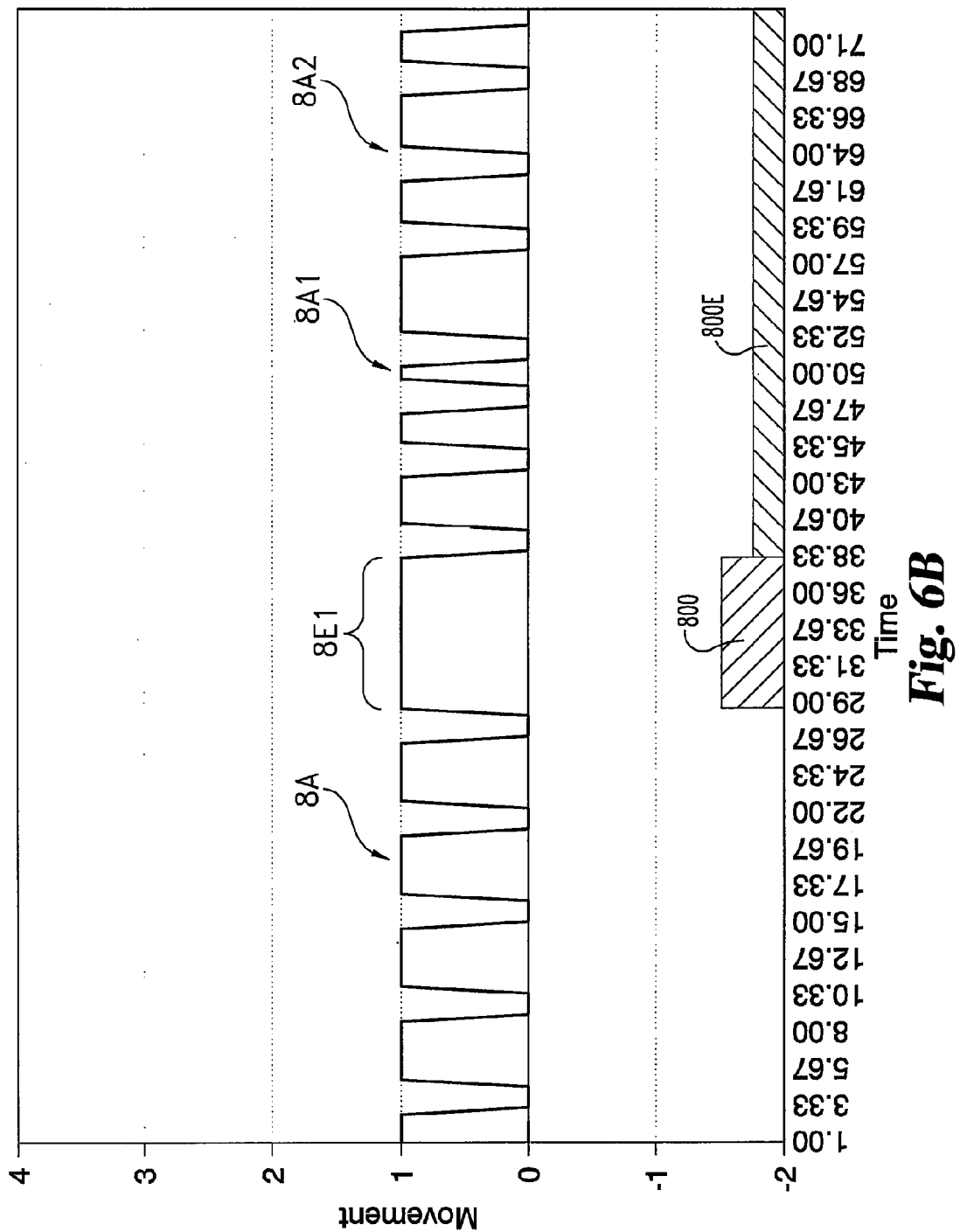
FIG. 6B are variations of an actuator movement profile as compared to FIG. 6A.

Referring to FIGS. 6A and 6B, another example of actuator profile movement may be seen. In profile 8A is illustrated, generally cyclical between two positions, with stationary periods therebetween. This is illustrated in FIG. 6A, and analogous to FIG. 5B, may be one example of a baseline or first actuator motion profile or first mode. This profile motion may be applied to any actuator, but for example may be typical of a lumbar actuator if that feature optionally is used in the present system. FIG. 6B is similar, except that suspended mode 800 leads to a longer period of non-motion, depicted at 8E1. Motion suspension mode 800 may be caused by one or more triggering events such as driver/vehicle events described elsewhere. This may be analogous to mode 701 in FIG. 5E. Likewise, in second actuator mode 800E (FIG. 6B), this may correspond to city driving. The particular example, profile movements shown at 8A1 and 8A2 are shown as somewhat randomized or erratic, but otherwise cycling between two positions. They may be non-cyclical, and alter amplitude or otherwise, as with the other profiles described in this application. Likewise, the profiles of FIG. 6A and FIG. 6B may be mixed and matched and/or combined with profiles 5A-5E, 7-17, 18 and 19, or otherwise. The profiles in FIGS. 3A-6B, as well as 7-19, may be predetermined. However, optionally some or all of them may be randomized, or at least partially randomized within constraints.

Figure 17:
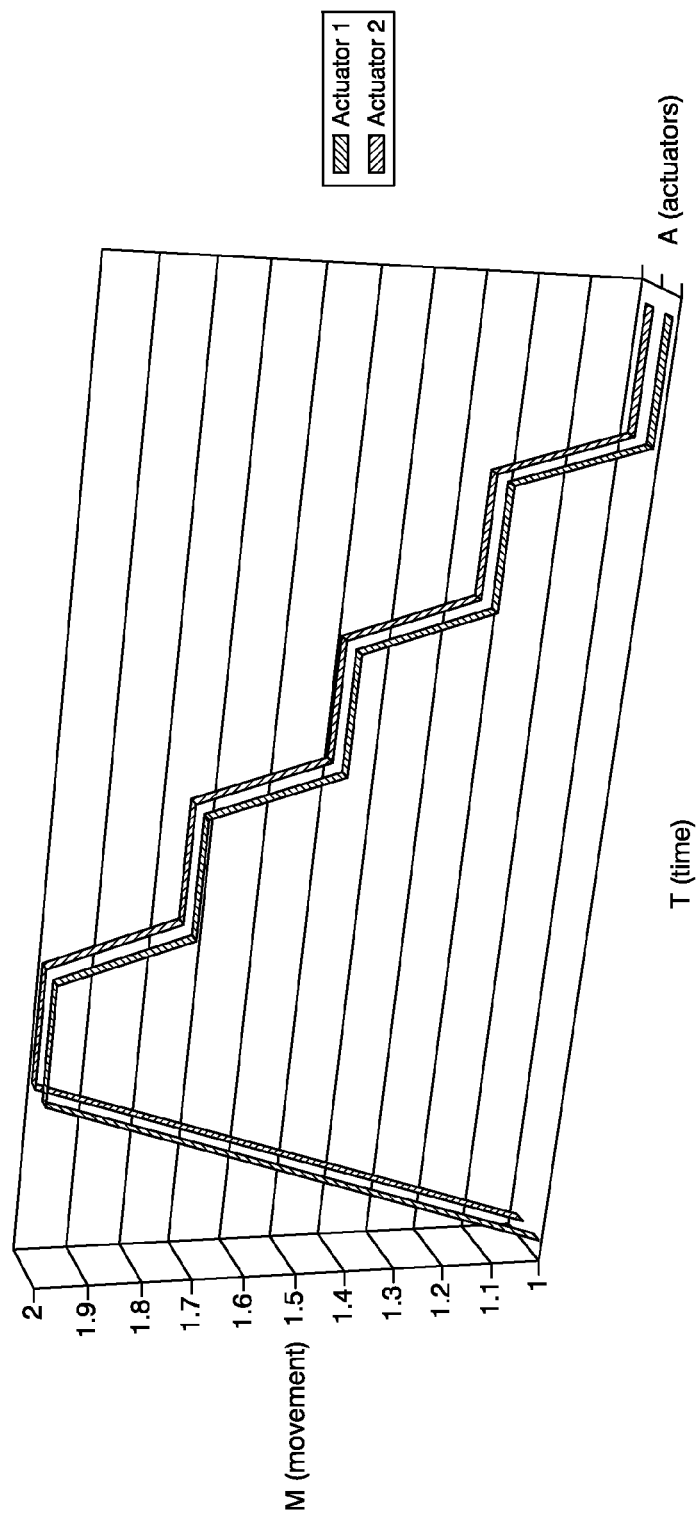
Figure 18:
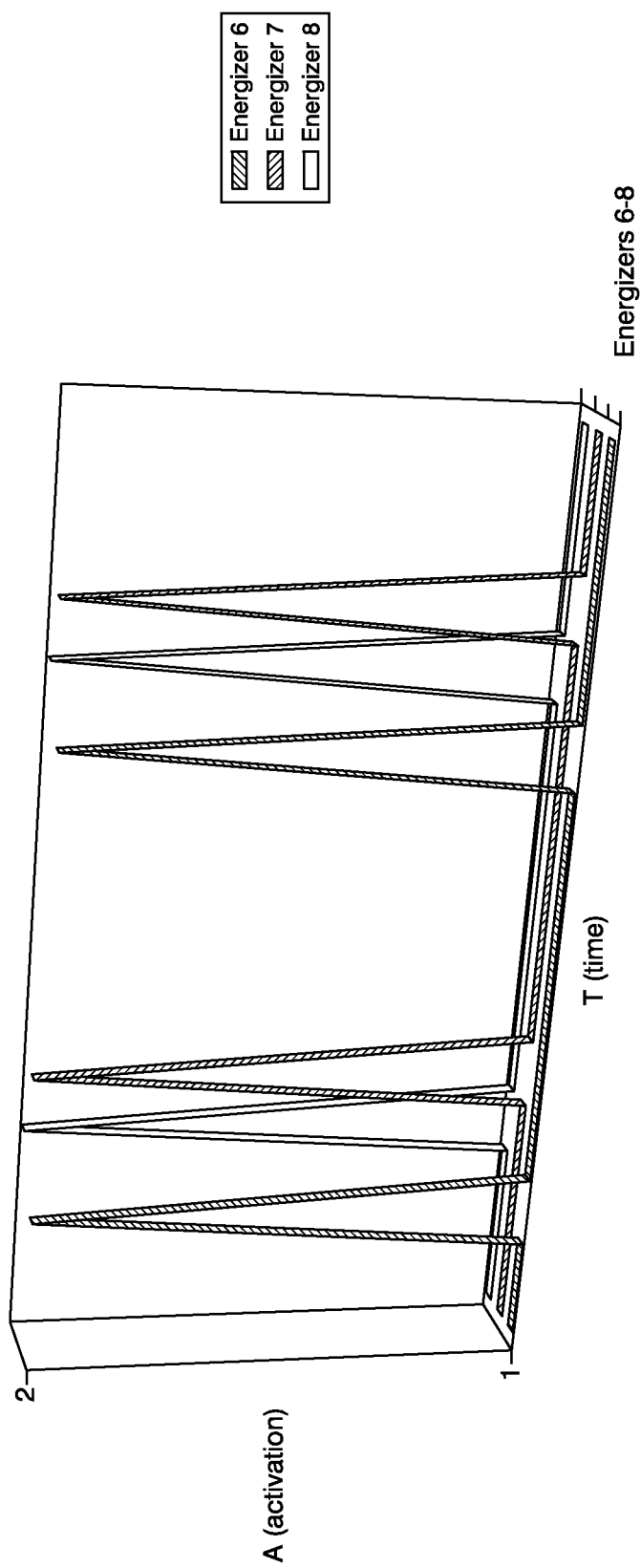
FIGS. 18-19 are graphic illustrations of further examples of condition profiles of a vehicle seating system.
Figure 19:
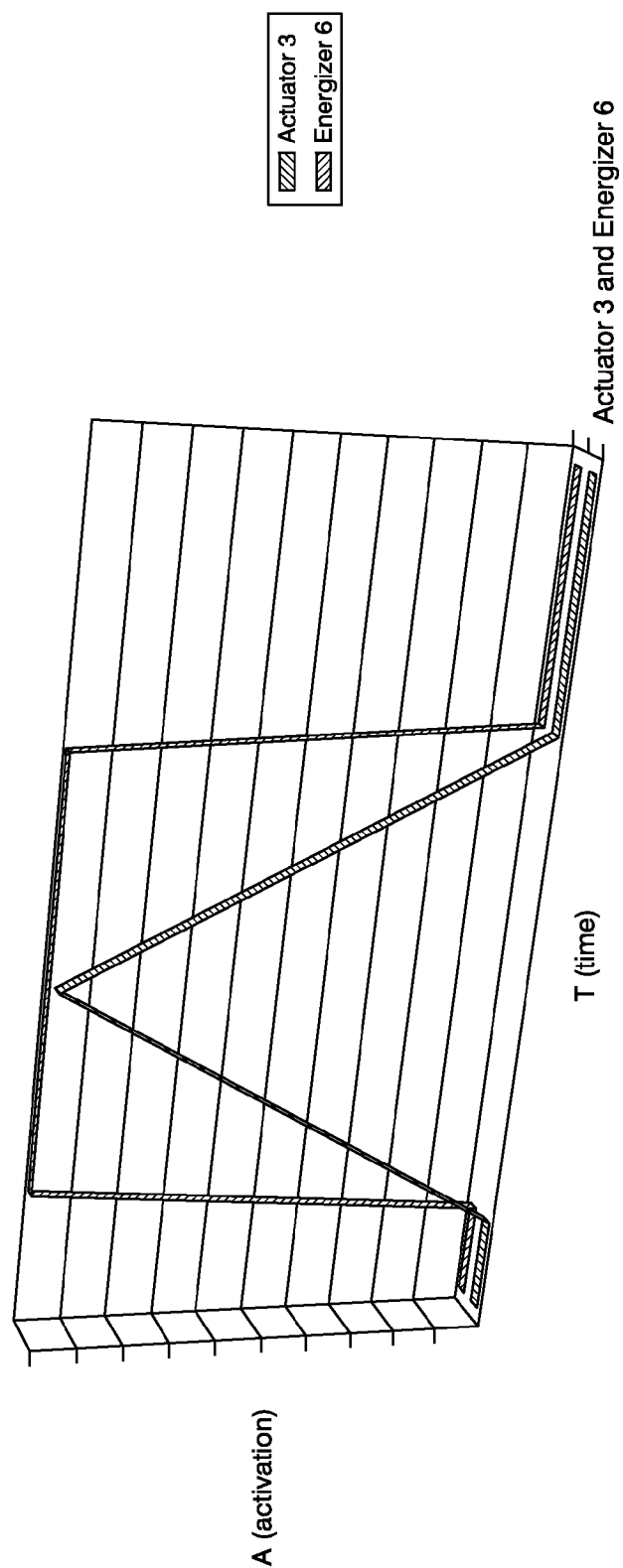

The following FIGS. 7-17 as well as FIGS. 18 and 19 are merely further examples of possible baseline or first movement profiles, with being understood that such movement profiles may be changed, either in binary form, transitory or otherwise, as previously described in connection with FIGS. 3A-6B.

FIGS. 7-17 are graphic illustrations of various embodiments of a vehicle seating system to adjust the position of the vehicle seat. The figures further illustrate movement of various actuators along a horizontal Time axis and a vertical Movement axis. The Movement axes generally include a "1" denoting a first position and a "2" denoting a second position, and certain figures include delineations along the Movement axes denoting partial movement between the first and second positions. It should be appreciated that the first and second positions can be various combinations of actuators and activation position levels thereof, and can be randomly chosen or predetermined by the system or a user of the system. They could be full stroke or partial stroke (or rotation) of the actuators. In certain embodiments, the transition time for the actuators to move from the first positions to the second positions is in the range of 20-40 seconds.

FIGS. 7-17 represent only a few of numerous embodiments of actuator movement profiles of a vehicle seating system as described herein. In the illustrated embodiments, optionally a first time period passes before movement on Movement Axis M between positions 1 and 2 of one or more actuators begins. In certain embodiments, the initial movement of one or more actuators is the beginning of the control period. In certain other embodiments, the control period includes an initial period of time of inaction of the actuators. In other words, in certain embodiments the Time axis T begins with the vehicle turning on, and in certain other embodiments, the Time axis T begins with the beginning of the control period. Further, the illustrated embodiments are not meant to be limiting in any manner, including regarding the number of actuators illustrated in the figures. It should be appreciated that the embodiments illustrated in the figures can include movement of a different number of actuators as would occur to one skilled in the art. Also, although the movement profiles illustrated in FIGS. 7-17 are linear segments, they may optionally include curvilinear segments as well. In certain embodiments, the actuators move with a slow movement speed average of less than about 15 centimeters per second. In some embodiments, the actuators move with a slow movement speed average of less than about 10 centimeters per second, and may be an average of less than about 2 centimeters per second. Additionally, it should be appreciated that the activity of the actuators illustrated in the figures can continue indefinitely along the Time axis, with only a segment of the activity shown for clarity. Also, any and all of the profiles in FIGS. 7-17 and otherwise may be combined with each other.

The control period may include one continuous movement period, wherein at least one actuator is moving through different seating positions. Two such actuators may move continuously; however, it should be appreciated that a different number of actuators can reposition the seat during the movement period. The movement period may include cycling of the various actuators from first positions to second positions continually until the control period ends.

Figure 7:
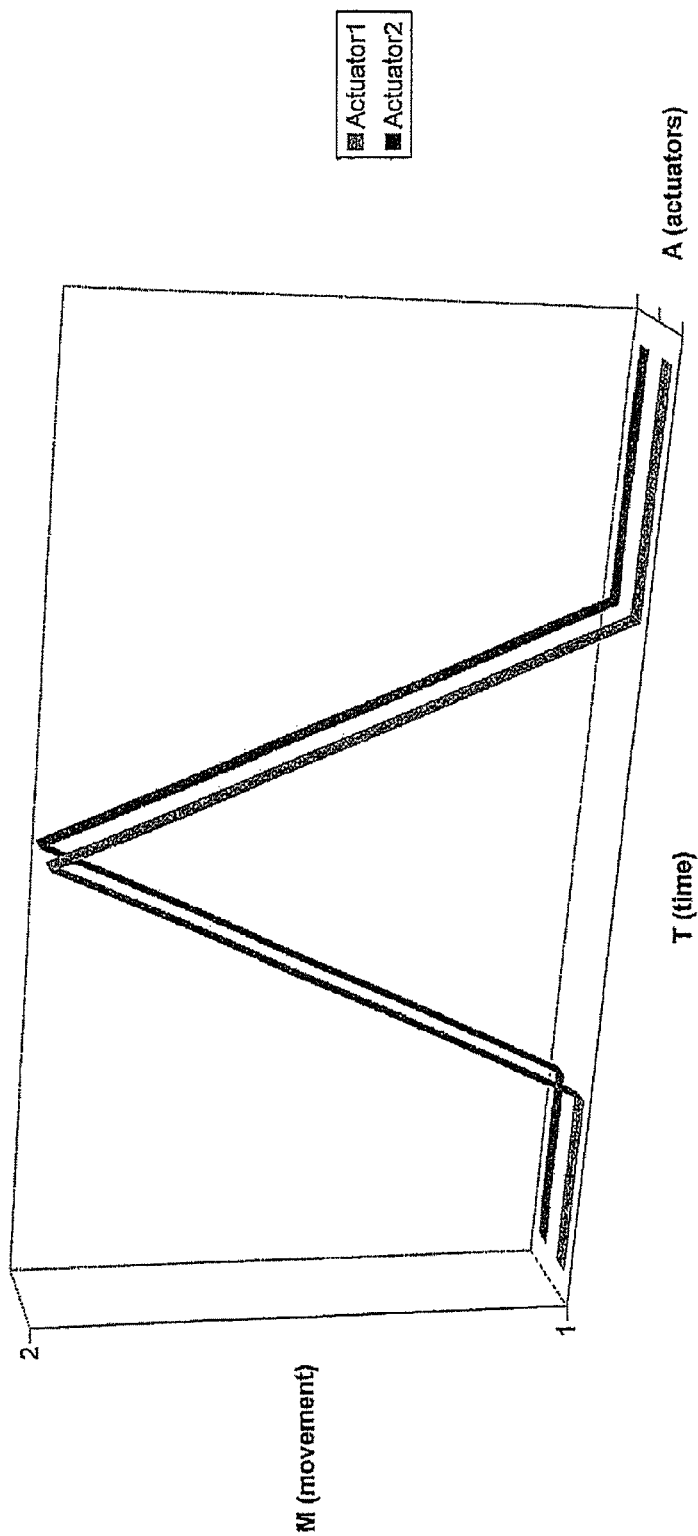
FIGS. 7-17 are other of various examples of movement profiles of a vehicle seating system.

FIG. 7 is a graphic illustration of another possible embodiment of a vehicle seating system. In the embodiment illustrated in FIG. 7, the control period includes a movement period followed by a stationary period of inaction of the actuators. It should be appreciated that this movement period and stationary period alternating combination can continue along the Time axis. The illustrated movement period includes cycling of the actuators from respective first positions to second positions, and returning to the first positions. The embodiment illustrated in FIG. 7 includes relatively slow cycling of the actuators to reduce positional fatigue of a user without significant disruption to the user.

Figure 8:
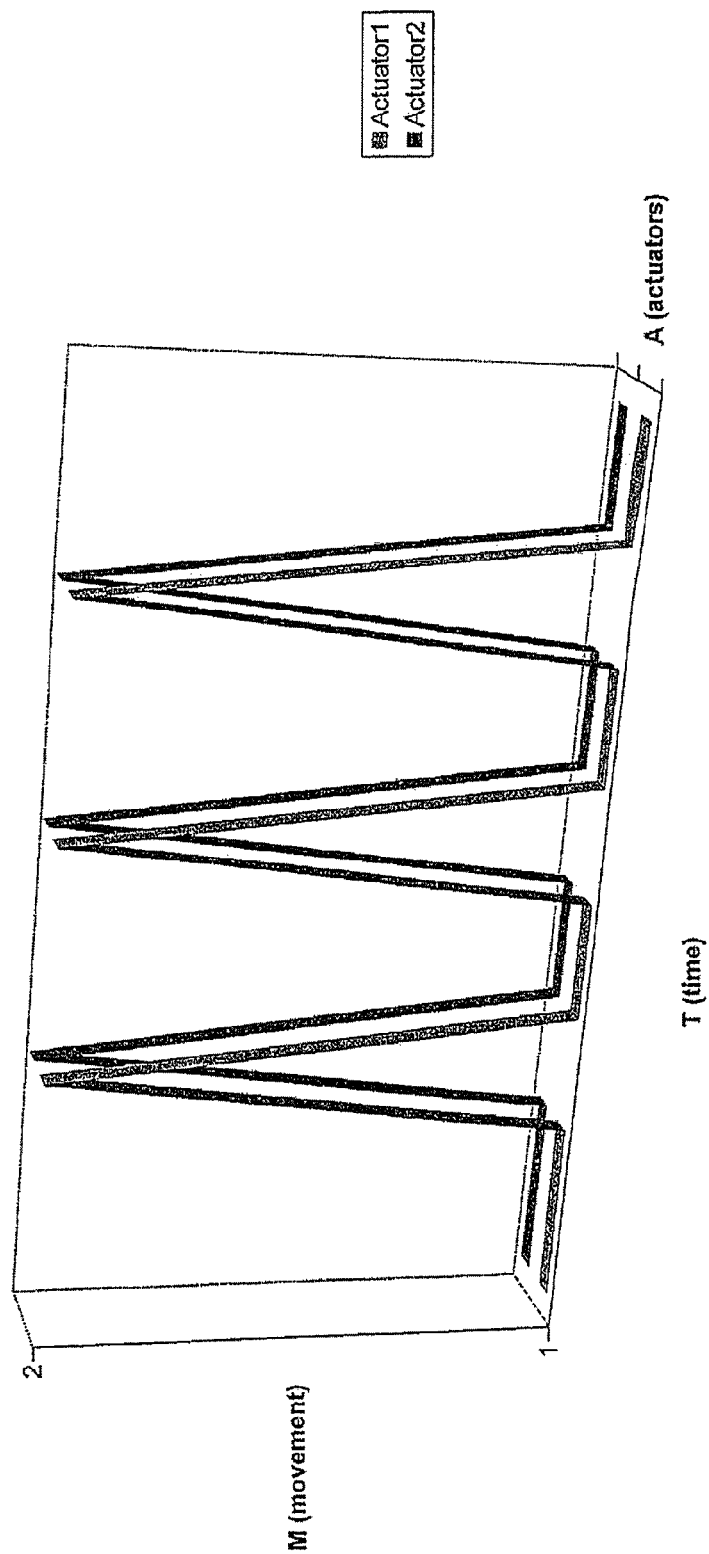

In the embodiment illustrated in FIG. 8, the control period includes alternating movement periods and stationary periods. In certain preferred embodiments, each movement period includes cycling of the actuators from first positions to second positions and returning to first positions. In such embodiments, each stationary period includes static positioning of the actuators at the first positions. However, it should be appreciated that, in certain alternative embodiments, a movement period can include movement of the actuators from first positions to second positions, and a next consecutive movement period can include movement of the actuators from second positions to first positions, with such a continuing alternating pattern. Additionally, in certain alternative embodiments, the movement periods can include other segments of the cycling from first positions to second positions, with stationary periods occurring therebetween.

Figure 9:
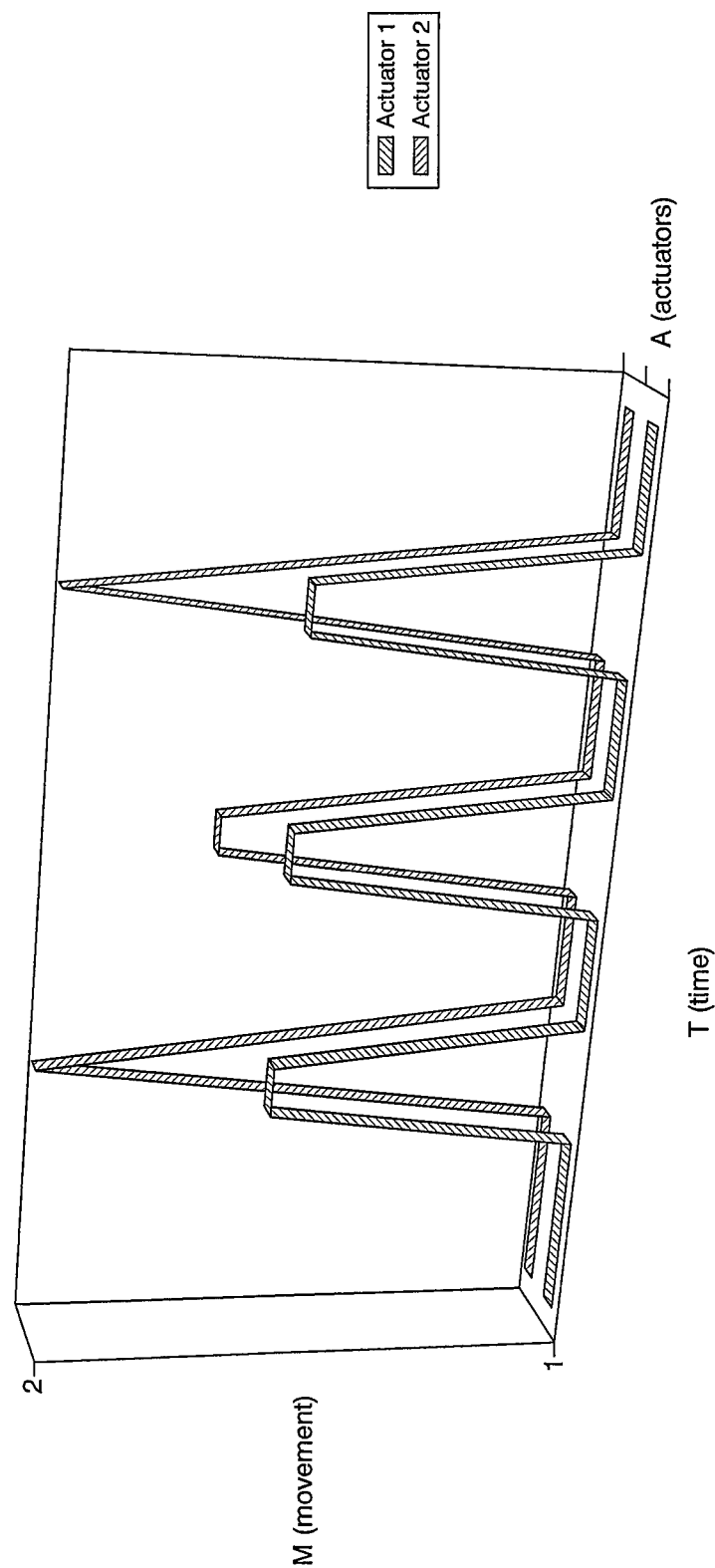

FIG. 9 is a graphic illustration of yet another possible embodiment of a vehicle seating system. In the embodiment illustrated in FIG. 9, the movement is similar to that in FIG. 8, except that there are additional stationary periods occurring after some of the movement segments and before returning to the original position "1" as illustrated.

Figure 10:
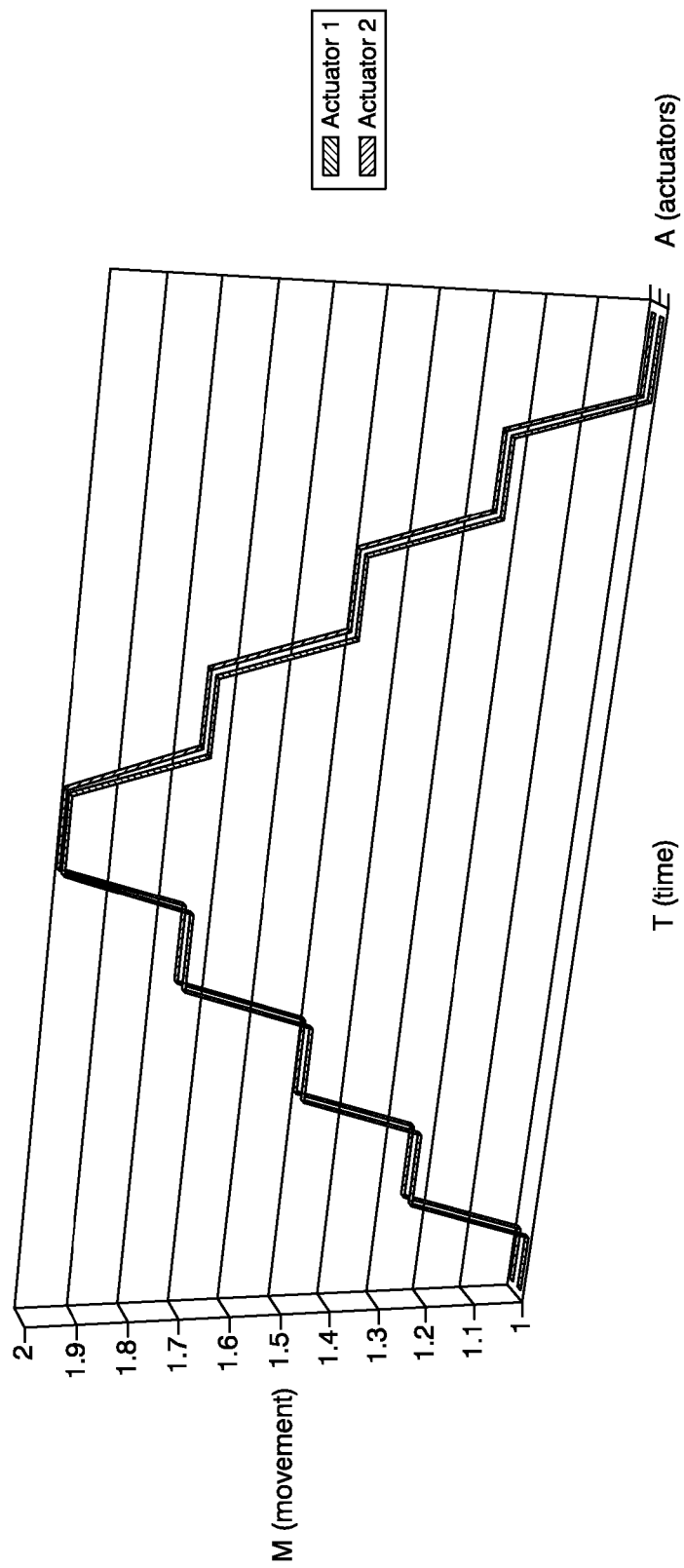

FIG. 10 is a graphic illustration of yet another possible embodiment of a vehicle seating system. In the embodiment illustrated in FIG. 10, the control period includes alternating movement periods and stationary periods. In certain embodiments, each movement period includes slight movement of at least one actuator along a segment of the distance between the first and second positions. The movement periods begin with the at least one actuator moving from a first position toward a second position, reaching the second position and then returning toward a first position, with stationary periods occurring throughout. In certain embodiments, the stationary periods are longer in duration than the movement periods, as illustrated. In the illustrated embodiment, the movement periods include movement equivalent to a quarter segment of the distance between the first and second positions. However, it should be appreciated that the movement periods can include different length segments as would occur to one skilled in the art, including different lengths than the illustrated embodiment and/or different lengths within the same control period for different movement periods. It is also contemplated that movement of one or more other actuators occurs when the illustrated actuators are stationary. In such cases, one or more actuators move and then are stationary, and then one or more other actuators move while the first set of actuators are stationary.

Figure 11:
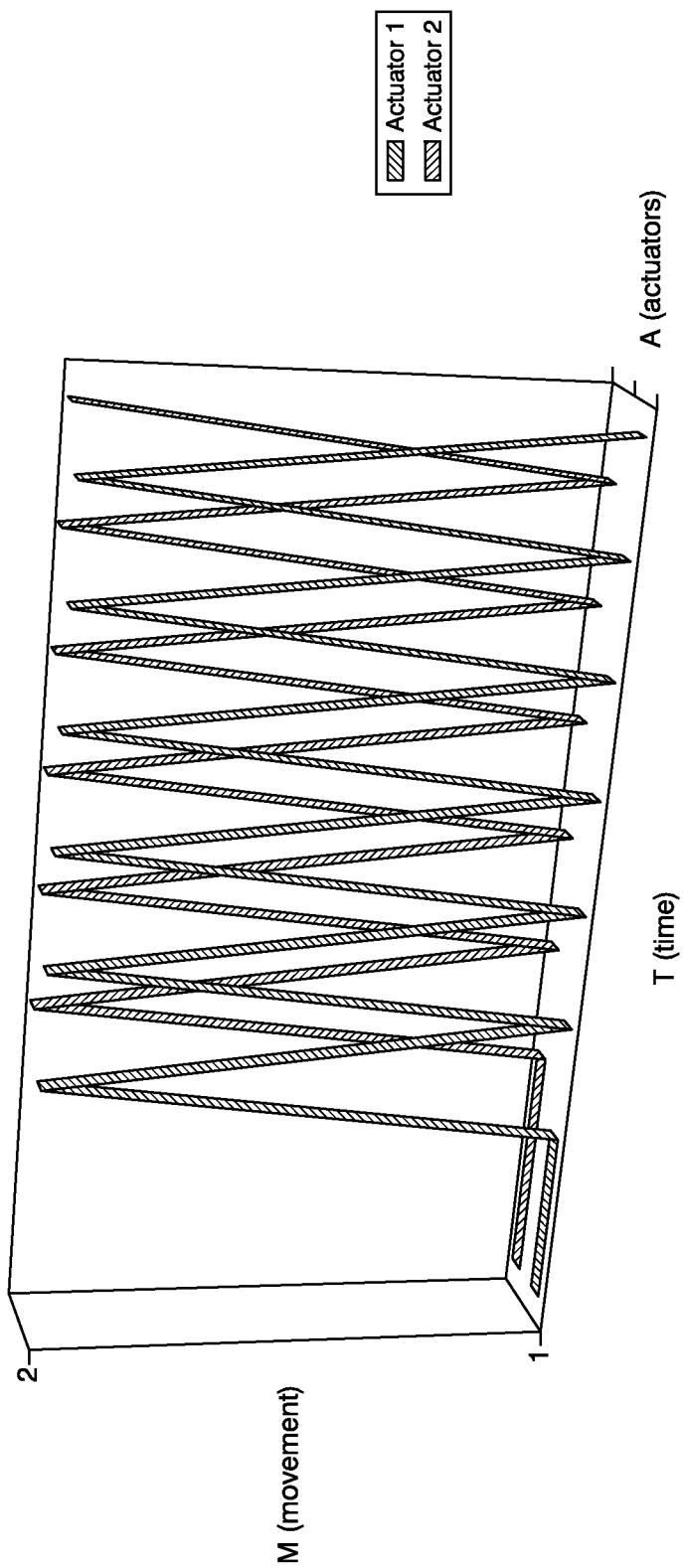

In the embodiment illustrated in FIG. 11, the control period includes one continuous movement period, wherein the actuators are moving through different seating positions, with one actuator moving before another. FIG. 11 illustrates two such actuators; however, it should be appreciated that a different number of actuators can reposition the seat during the movement period. The movement period illustrated in FIG. 11 includes cycling of the various actuators from first positions to second positions continually until the control period ends. In some embodiments, the actuators move such that certain actuators reach first positions when various other actuators reach second positions, and vice versa. In certain embodiments, the movement period illustrated in FIG. 11 includes movement of at least two seat adjustment actuators.

Figure 12:
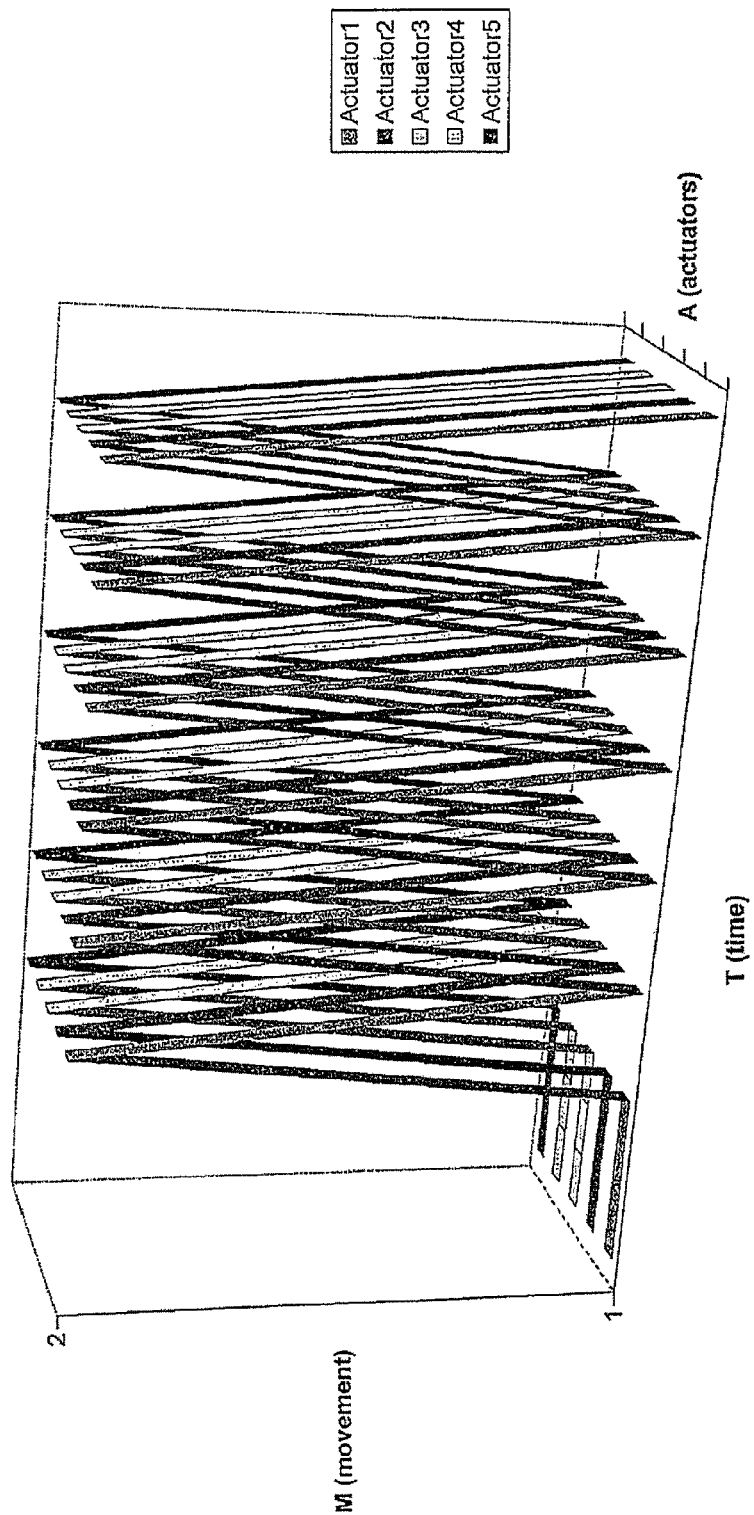

FIG. 12 is a graphic illustration of even another possible embodiment of a vehicle seating system. The control period illustrated in FIG. 12 includes one continuous movement period, wherein the actuators are moving simultaneously through different seating positions. In certain embodiments, the five actuators illustrated in FIG. 12 are the five actuators described in connection with FIG. 1B. The movement period illustrated in FIG. 12 includes cycling of the various actuators from first positions to second positions, and back to first positions, continually until the control period ends and with a relatively slow movement average.

Figure 13:
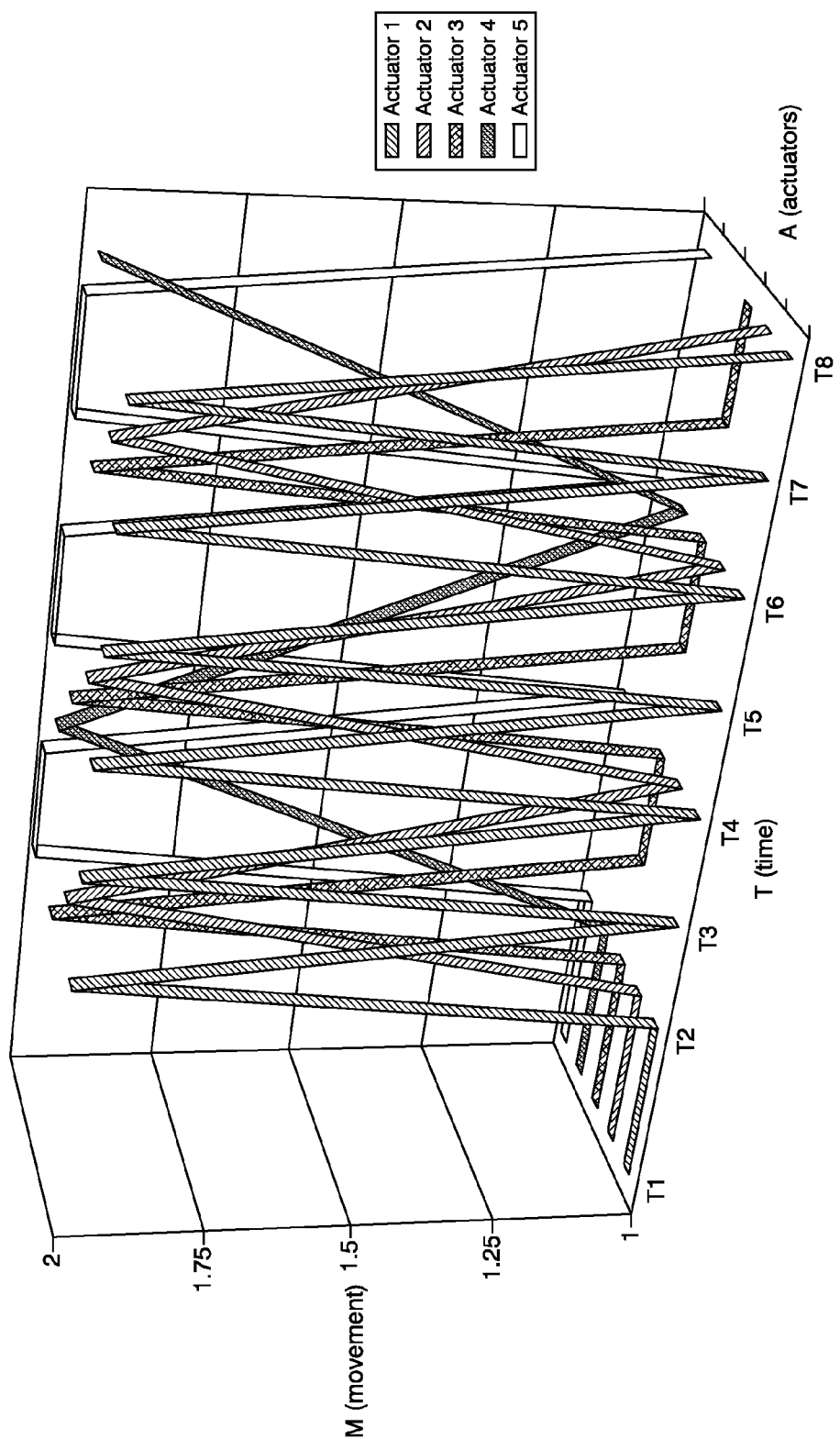

In the embodiment illustrated in FIG. 13, the control period includes various combinations of movement periods and stationary periods, wherein the actuators are moving through different seating positions. The movement period illustrated in FIG. 13 includes cycling of the various actuators from first positions to second positions, with some actuators having stationary periods at certain positions. FIG. 13 is illustrative of the possibility of the various actuators being activated to move at different speeds, and with different combinations of movement periods and stationary periods. Additionally, in certain embodiments, a user can preprogram various desired seating positions to be cycled through. It is contemplated that a user may set each actuator to a desired position, with the actuators collectively defining a preprogrammed seating position. In other embodiments, the seating positions are chosen at random by the system.

FIG. 13 illustrates times T1 through T8. In certain embodiments, the vehicle is turned on at time T1, with electrical controller C being activated and initiating a control period at time T1. In the illustrated embodiment, a first stationary period occurs from time T1 to time T2, in which the actuators remain motionless at position 1, and movement periods begin at time T2. During the movement periods, the actuators cycle at various speeds and through various positions. In the illustrated embodiment, for example, actuator 1 cycles continuously through a single movement period from time T2 to T8, while actuator 5 includes alternating movement periods and stationary periods. Additionally, as a possible example, from time T2 to time T3, actuator 1 cycles from position 1 to position 2 and back to position 1, while actuator 5 cycles from position 1 to position 2 relatively quickly and then remains at position 2 through time T3. Actuator 5 then returns relatively quickly to position 1 at time T4, with this pattern continuing through the movement periods and stationary periods. However, it should be appreciated that other patterns can be implemented for the actuators as would occur to one skilled in the art and/or as desired by a user of the system. Additionally, it should be appreciated that the various movement patterns of the actuators can be randomly chosen by the vehicle seating system or can be pre-programmed by a user of the system. For brevity, the discussion of a control period including times T1 through T8, and the examples discussed herein, have been provided in conjunction with FIG. 13, but similarly apply to FIGS. 7-17.

Figure 14:
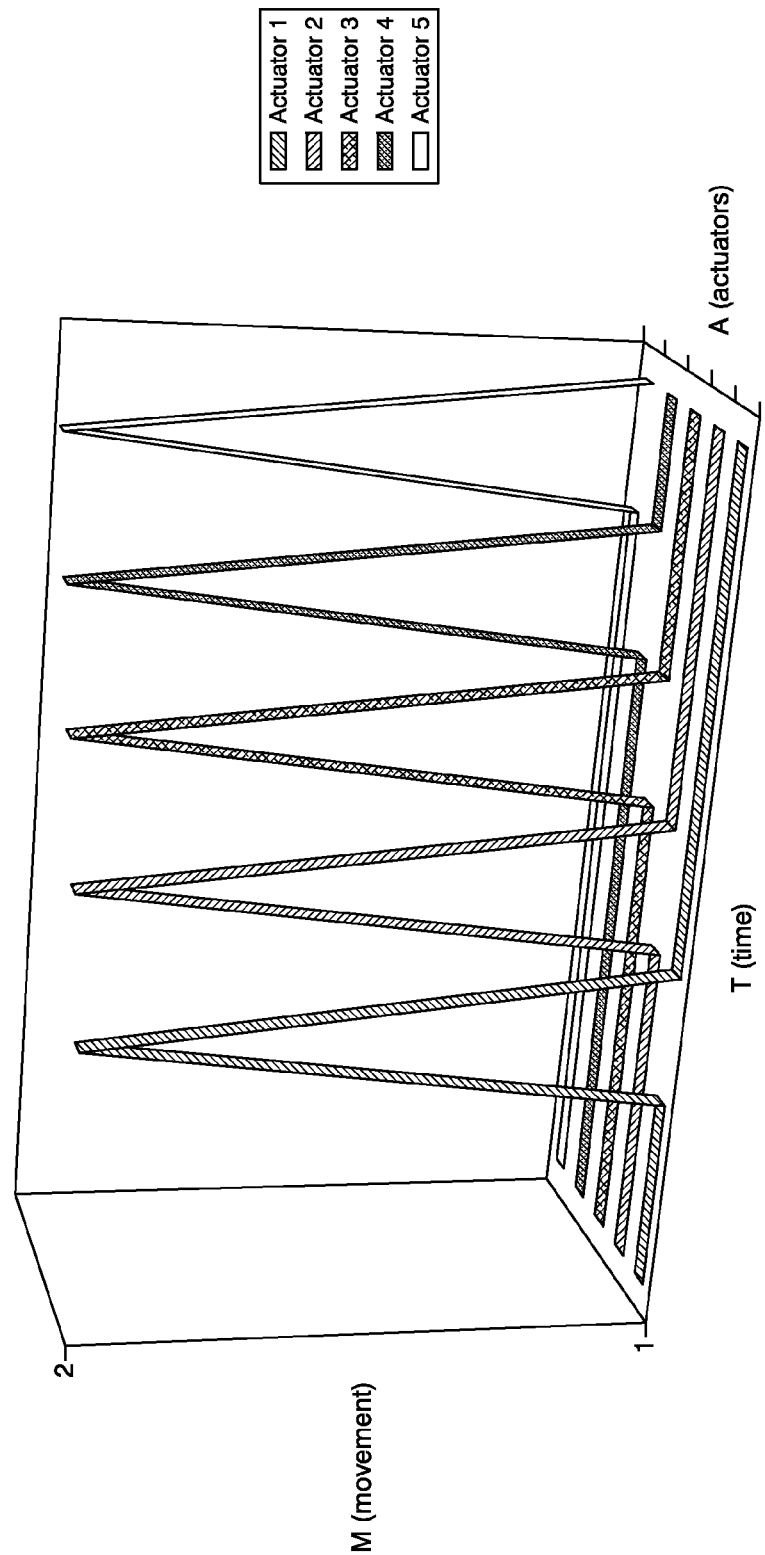

FIG. 14 is a graphic illustration of another possible embodiment of a vehicle seating system. The control period illustrated in FIG. 14 includes movement periods in which only one actuator is cycling through seating positions at a time. In certain embodiments, a first actuator cycles from a first position to a second position and back to a first position, with other actuators then following the same pattern. In such embodiments, each actuator includes periods of inactivity, with the overall control period including one continuous movement period with only one actuator cycling at a time.

Figure 15:
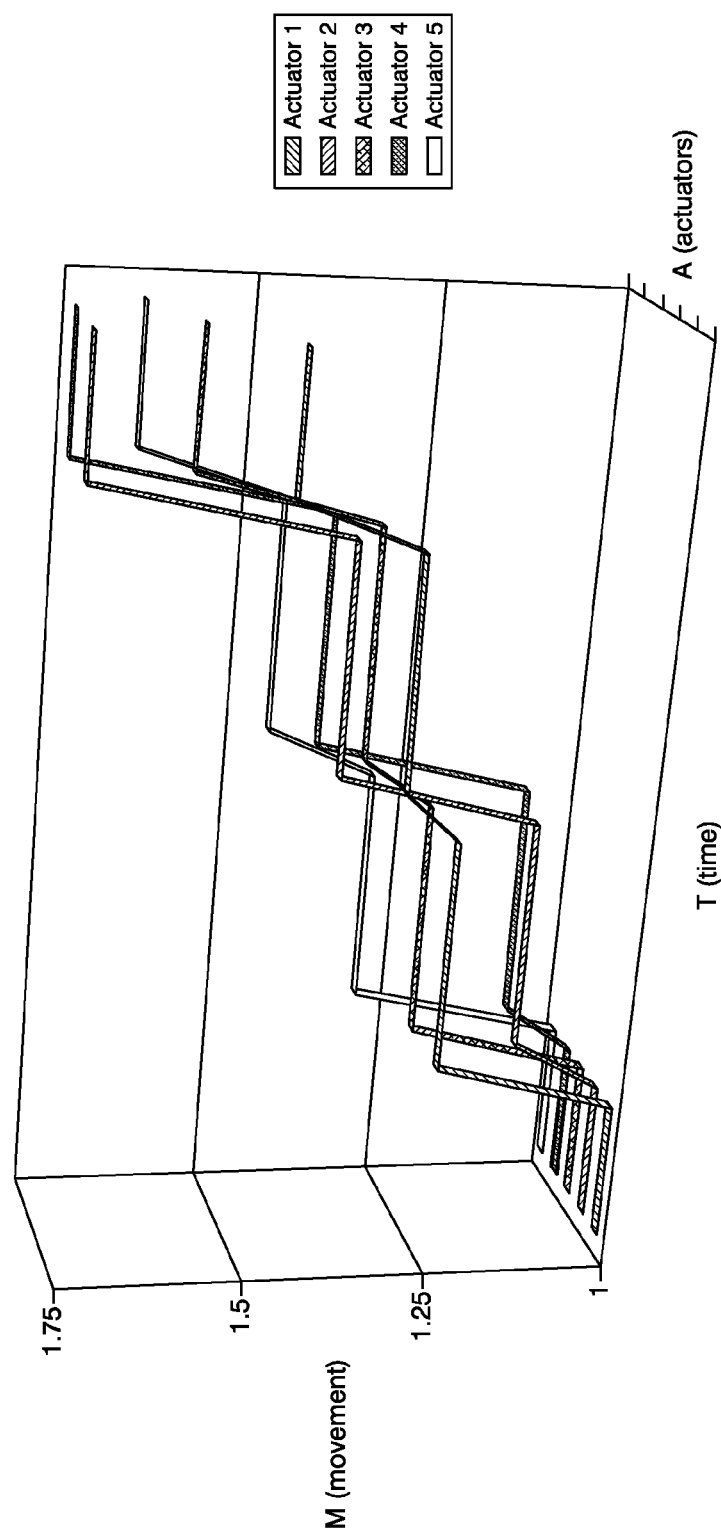

In the embodiment illustrated in FIG. 15, the control period includes alternating movement periods and stationary periods. The movement periods include movement of the actuators to specified predetermined positions, with stationary periods occurring therebetween. In certain preferred embodiments, a user of the system pre-selects one or more seating positions using a combination of positions of the actuators. In such embodiments, the movement periods cycle the actuators to the pre-selected seating positions with a slow movement average over the control period.

Figure 16:
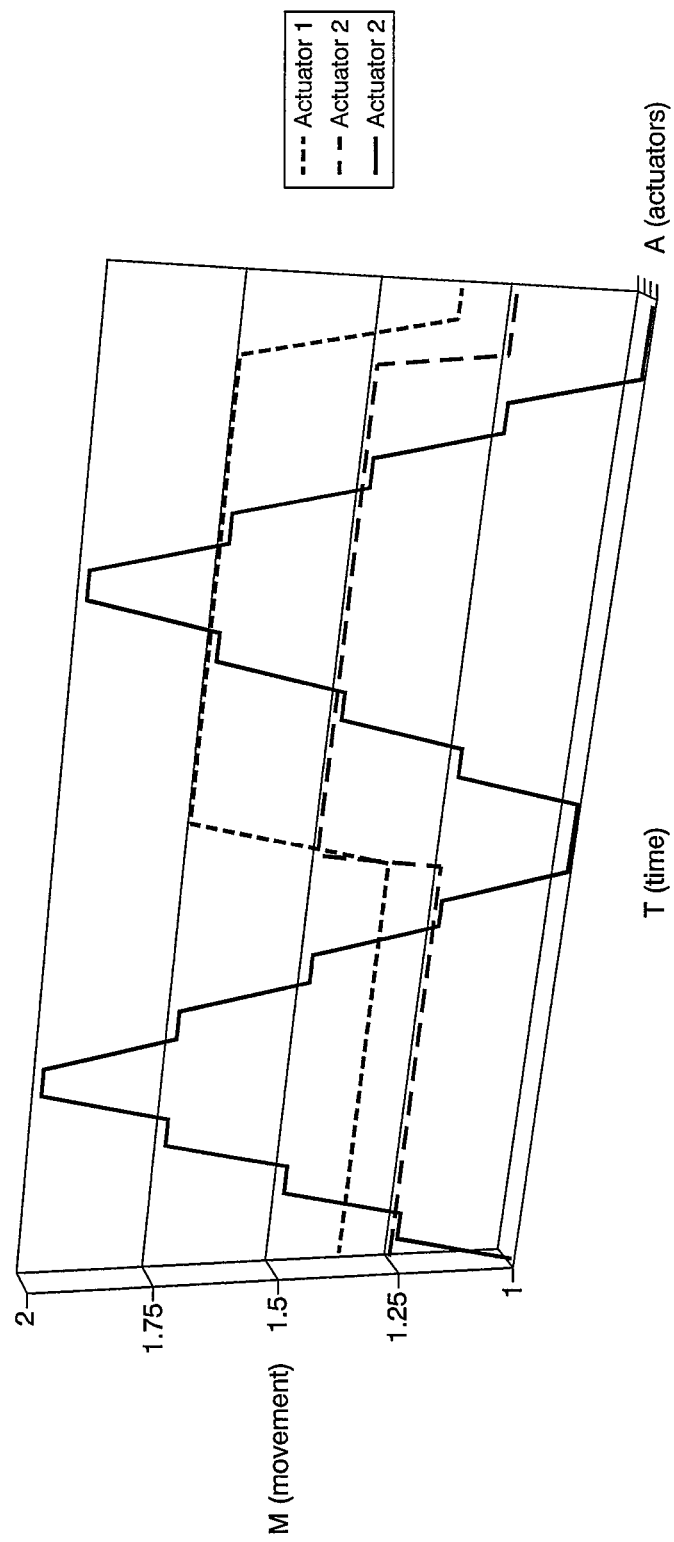

FIG. 16 is a graphic illustration of even another possible embodiment of a vehicle seating system. In the embodiment of FIG. 16, the control period includes alternating movement periods and stationary periods with reference to different actuators. Initially, actuators 2 and 3 are stationary at respective home positions while actuator 1 alternates between movement and stationary periods to slowly transition from a first position to a second position and back to the first position. Upon returning to the first position, actuator 1 remains stationary at the first position while actuators 2 and 3 transition to respective second positions. Thereafter, actuators 2 and 3 remain stationary at the respective second positions while actuator 1 again slowly transitions from a first position to a second position and back to the first position via alternating movement periods and stationary periods. Upon returning to the first position, actuator 1 remains stationary at the first position while actuators 2 and 3 transition from the respective second positions back to the respective home positions. In such embodiments, the actuators may continue such cycling pattern indefinitely.

FIG. 17 is a graphic illustration of a further possible embodiment of a vehicle seating system. The illustrated embodiment in FIG. 17 includes an initial movement spike of actuators 1 and 2 from a first position to a second position, followed by alternating movement and stationary periods to return the actuators from the second position to the first position. In such embodiments, the initial movement spike includes increased relative movement of the actuators as compared to movement within the subsequent movement periods. As with the other embodiments, the first and second positions may be random, predetermined and/or pre-selected by a user as desired.

Additional embodiments of a vehicle seating system include a typical vehicle seat mountable in a vehicle, at least two powered seat adjustment actuators, such as energizer members including at least one thermal energizer to adjust the temperature of the seat, and an electrical controller. The energizer members may also include mechanical energizers, such as a massaging energizer, a thigh or seat-extending actuator and/or seat position actuators as described above. The energizer members are optionally able to transition between various settings in conjunction with the seat to provide comfort to a user of the system and impact the user's circulation, thereby reducing positional fatigue experienced by the user. The electrical controller may have a control period which generally includes at least one activation period and, in certain embodiments, at least one stationary or hold period. In a typical embodiment, the electrical controller initiates the control period after a first time period beginning when the vehicle is turned on. Thereafter, the control period may include at least one activation period where the energizer members automatically cycle through seating conditions to impact the user's circulation and reduce long distance traveling fatigue.

FIGS. 18-19 are graphic illustrations of various embodiments of a vehicle seating system. Similar to FIGS. 7-17, FIGS. 18-19 illustrate movement or activation of various energizer members along a horizontal Time axis and a vertical Activation axis. The Activation axes generally include a "1" denoting a first status and a "2" denoting a second status, and certain figures include delineations along the Activation axes denoting partial movement of the position-adjustment actuators between the first and second statuses. It should be appreciated that the first and second statuses can be various combinations of energizer members, and activation levels thereof, and can be randomly chosen or predetermined by the system or a user of the system. In certain embodiments, regarding energizers E6 through E8, the first situation "1" represents the particular energizer in the "off" position and the second situation "2" represents the particular energizer in the "on" position.

FIGS. 18-19 represent only two of the numerous possible embodiments of condition profiles of a vehicle seating system, such as system 130. In the illustrated embodiments, optionally a first time period passes before activation on Activation axis A of one or more energizer members begins. In certain embodiments, the initial activation of energizer members is the beginning of the control period. In certain other embodiments, the control period includes an initial period of time of inactivation of the energizer members. In other words, in certain embodiments the Time axis T begins with the vehicle turning on, and in certain other embodiments, the Time axis T begins with the beginning of the control period. Further, the illustrated embodiments are not meant to be limiting in any manner, including regarding the number of energizer members illustrated in the figures. It should be appreciated that the embodiments illustrated in the figures can include activation of a different number of energizer members. Also, although the condition profiles illustrated in FIGS. 18-19 are linear segments, they may optionally include curvilinear segments as well. It should be appreciated that the activity of the energizer members illustrated in the figures can continue indefinitely along the Time axis T, with only a segment of the activity shown for clarity. Also, any and all of the profiles in FIGS. 7-17 and 18-19 may be combined with each other.

FIG. 18 is a graphic illustration of a possible embodiment of a vehicle seating system, such as system 130 for example. The control period illustrated in FIG. 18 includes activation periods in which only one energizer member is initiated to transition through seating conditions at a time. In certain embodiments, a first energizer member transitions from a first status to a second status and back to a first status, with other energizer members then following the same pattern. In such embodiments, each energizer member includes periods of inactivity, with each activation period including only one energizer member transitioning at a time. In the embodiment illustrated in FIG. 18, heating energizer E6 initially transitions to the second status "2" for a certain amount of time, representing that the heating energizer is turned on, with the heating energizer E6 then transitioning back to the first status "1", representing that the heating energizer is turned off. According to the illustrated embodiment, following the activation of heating energizer E6, massaging energizer E8 follows a similar pattern and then cooling energizer E7 follows a similar pattern. A hold period follows activation of the cooling energizer E7, with the pattern continuing again after the hold period.

FIG. 19 illustrates another graphic illustration of a possible embodiment of a vehicle seating system, such as system 130 for example. In the embodiment illustrated in FIG. 19, the control period includes an activation period with one or more energizer members remaining at the second status while one or more other energizer members are slowly transitioning between the first and second statuses. In certain embodiments, the control period begins when the vehicle is turned on, and thereafter includes a hold period before activation of energizer members is initiated. Additionally, in certain embodiments, each activation period includes slow movement of at least one position-adjustment actuator, such as lumbar actuator A3, between the first and second statuses, while at least one thermal energizer, such as heating energizer E6, continually remains at the second "on" status. It is contemplated that the activation and hold periods can be longer or shorter in time, than as illustrated in FIG. 15, as would generally occur to one skilled in the art.

During the activation periods of the illustrated embodiment, the energizer members cycle at various speeds and through various statuses. For example, heating energizer E6 may transition to the second "on" status, remain at the second status for a certain time period and then transition back to the first "off" status. At the same time, in the illustrated embodiment, lumbar actuator A3 may be activated and slowly transition from a first status to a second status, and back to a first status. In other embodiments, lumbar actuator A3 could transition at least twice between the first and second statuses during one activation period. However, it should be appreciated that other patterns can be implemented for the energizer members. Additionally, it should be appreciated that the various patterns of the energizer members can be predetermined routines, randomly chosen routines, and/or can be pre-programmed by a user of the system.

Figure 20:
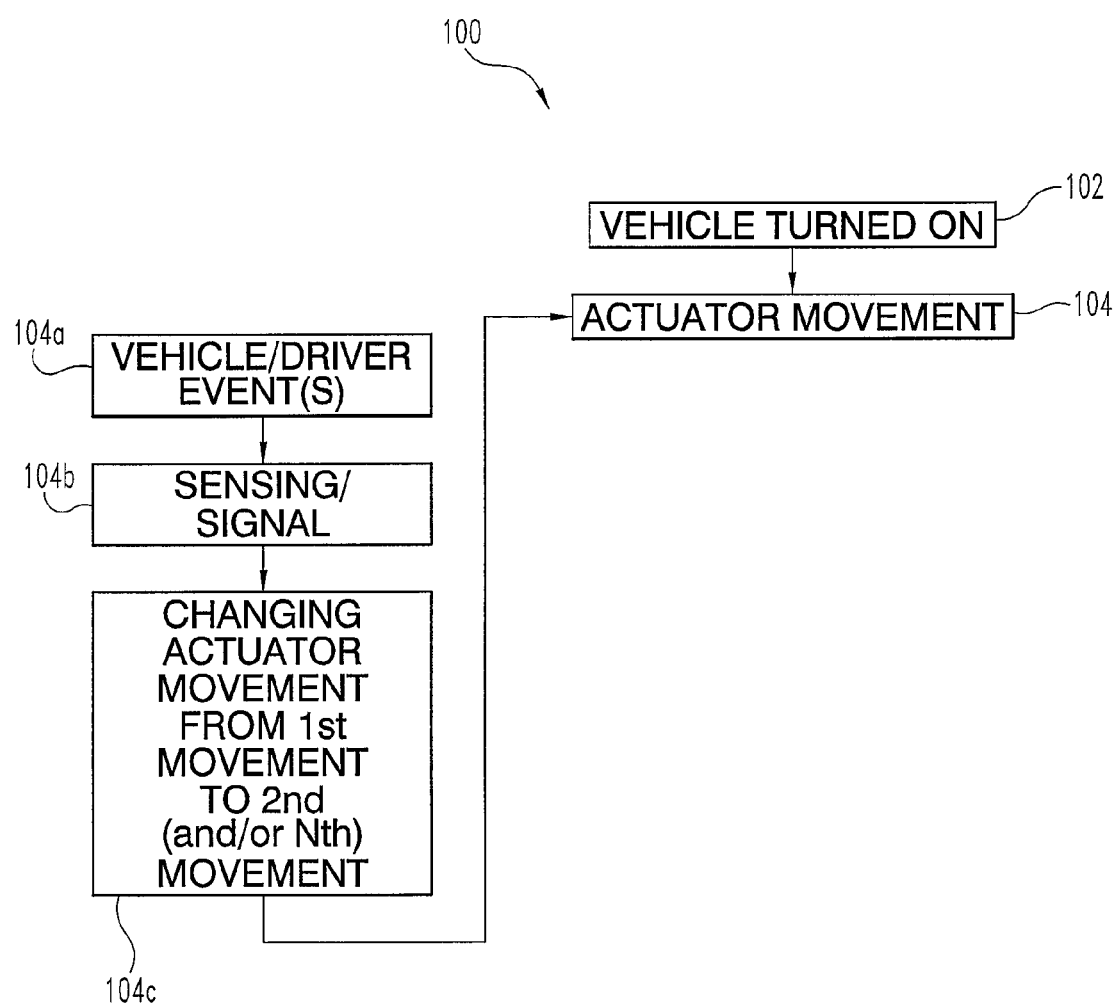
FIG. 20 is a flow diagram of a vehicle seating system according to an embodiment of the present disclosure.

FIG. 20 illustrates a block diagram of a system 100, and particularly one example of optional steps. The vehicle turned on step 102 includes, at a minimum, turning on the engine, but more preferably also may include placing the vehicle transmission in drive. At some point, preferably during the control period, actuator movement 104, begins with one or more actuators as previously described. Such actuator movement is in a first average movement, typically ascertained in terms of frequency and/or amplitude, as described elsewhere. Vehicle/user events 104 cause a controller, which is adapted for receiving at least one signal based on such vehicle/user events, occurs at step 104B. While the vehicle is turned on, and preferably while the vehicle is moving, the step 104C of changing movement from a first movement to a second movement (and/or other movements), third movement, fourth movement . . . nth movement occurs to alter actuator movement 104. Examples of vehicle/user events are detailed further below. The vehicle/user event may include differentiating between highway driver and slower, non-highway driving, such as for example city driving. They may cause changes in an average movement frequencies that are the time between movements a corresponding actuator, and/or are the time between first movement position to a second movement position back to a first position. Preferably, but not necessarily, there is at least one stationary period of at least five minutes in duration in which a given power seat actuator are motionless while the vehicle is moving, and this optionally is followed by actuator movement automatically after that stationary period. The changing actuator movement 104C also may include automatically adjusting movement amplitude of one or more of the powered actuators. As detailed further below, vehicle/user events 104A may include one or more values or inputs. In but one example, these may include evaluation of one or more of elapsed time, speed and braking. For example, the controller may determine that an average speed is below 50 mph, and that in a elapsed time of five minutes, the brakes were tapped at least five times. Of course, these values may be changed. In such case, the controller may, in effect, be programmed to conclude the vehicle is in city mode, and accordingly adjust the profile to a city mode profile of movement, more classically having more frequent movement as previously described. Of course, city movement may also have periods of lesser frequency of movement, changes in amplitude or otherwise.

FIG. 21 illustrates a block diagram of a system 100 with optional aspects, the diagram showing various steps or stages of the system. Steps 102, 104, 104a, 104b, and 104c are as previously described. Initially, at step 102 the vehicle is turned on, namely the transmission is put in drive while the motor is running, by a vehicle user. Step 104 represents movement of one or more seat adjustment actuators to alter the seating position of the vehicle seat. In certain embodiments, the actuators are activated manually by a vehicle user. In such cases, the user may activate the actuators, typically individually, as desired to provide comfort for the user. In certain other embodiments, the actuators are automatically activated by an electrical controller, which will be discussed in greater detail below with reference to FIGS. 5-20. In such cases, an optional step of triggering a control mechanism which initiates the automatic movement of the actuators may be present between steps 102 and 104. The control mechanism may include a button accessible to the user and linked with software on the electrical controller which controls the automatic movement of the actuators. In alternative embodiments, the automatic activation may be initiated when the vehicle is turned on at step 102.

Step 106 represents a vehicle user activating the vehicle's braking system by at least partially depressing the brake pedal of the vehicle to decelerate the vehicle. Under the present system, this triggering event leads to suspending any movement of the seat adjustment actuators. As an example, FIG. 2B shows a skeleton drawing of a typical vehicle braking system 200 using hydraulics, to better illustrate the operation of system 100. However, it should be appreciated that the present system may be used with many different vehicle braking systems, with system 200 only being one example of numerous possible configurations.

Movement of the actuators may be suspended at step 112 in response to application of the vehicle brakes, as discussed above. In typical embodiments, an electrical signal is sent to the electrical controller, as described above in connection with step 110, which directs the electrical controller to suspend movement of the actuators. However, other embodiments are contemplated, such as a mechanical linkage system or a hydraulic pressure system, as mentioned above, implemented to stop or redirect power sent to the actuators.

In accordance with the typical embodiment, electrical controller C may be encoded with logic executable to suspend movement of the actuators for a hibernation period upon receiving the electrical signal. In certain embodiments, the electrical controller suspends movement of the actuators during the time that the vehicle brakes are applied. The electrical controller may suspend movement of the actuators for an additional delay period after a vehicle user removes any foot pressure from the brake pedal. As an example, the delay period may be at least a few seconds, and normally at least 5, or sometimes at least 10 seconds after a user lets off the brake pedal. In a specific embodiment, the electrical controller suspends movement of the actuators during application of the vehicle brakes and for an additional delay period of about 15 seconds after the end of application of the vehicle brakes. The delay period may be longer or shorter. As another example, the delay period may be at least 1 minute after a user lets off the brake pedal. In even other embodiments, the electrical controller may suspend movement of the actuators until the user of the system reactivates the actuator movement. The vehicle seat occupies a temporary suspended position during the hibernation period corresponding to the positions of the actuators when movement is suspended. Following the suspension of movement, the actuators may be available for further independent movement by a user, or the electrical controller may reactivate automatic movement of the actuators as discussed below in connection with optional step 114.

Optionally, the electrical controller may be encoded with logic executable to reactivate automatic movement of the seat adjustment actuators at step 114. In certain embodiments, the actuators are automatically activated to move in accordance with a predetermined routine, and may be suspended in response to a critical event such as vehicle breaking, as described above. In such situations, the electrical controller may reactivate movement of the actuators following the critical event and continue with the same predetermined routine from the point where the routine was suspended. In other words, the vehicle seat may be said to have obtained a temporary suspended position when the suspension of movement of the actuators occurs, with the electrical controller being operable to reactivate movement of the actuators beginning from the temporary position. In one optional example, if the brake has been held for a period (e.g. over 10 seconds), the movement of the seats will resume; if the brake pedal is released mid-move, the then moving actuator with continue moving to its end point, but another actuator that follows will be paused a period of time (e.g. 5 seconds) before its movement. In certain other embodiments, the electrical controller may reactivate movement of the actuators following the critical event to return the seat to a base or home position. As described above, in certain embodiments the electrical controller may reactivate movement of the actuators following a delay period after a user lets off the brake pedal (and thus de-activates the vehicle braking system). In other embodiments, the electrical controller may reactivate movement of the actuators immediately after a user lets off the brake pedal, with the delay period being absent.

In alternative embodiments, the electrical controller may only reactivate movement of the actuators upon activation by a user of the system. Accordingly, the automatic movement of the actuators may be suspended until such time as a user of the system activates a triggering mechanism to re-start automatic movement of the actuators. Such embodiments may be associated with certain vehicle events such as air bag deployment. It is also contemplated that the system may provide for both automatic reactivation of the actuators as well as user reactivation of the actuators depending on the type of critical event which the vehicle experiences. As an example, braking alone may trigger automatic reactivation by the electrical controller, while air bag deployment may trigger suspension of actuator movement requiring user reactivation.

Another system according to the present disclosure (not diagrammed for simplicity) contemplates the electrical controller being operable to take notice of the activation status of the vehicle braking system to determine if suspension of movement of the actuators is required. In such cases, the electrical controller may use electrical signals proactively to determine if the brake pedal is depressed and accordingly suspend movement when necessary. In certain embodiments, the electrical controller may assess the activation status of the vehicle braking system before each predetermined routine begins and/or before each movement of an actuator within a predetermined routine. The system of proactively determining the activation status of the vehicle braking system can be implemented in addition to system 100, such that the two systems work together to suspend movement of the actuators during critical events the vehicle may undergo. One optional example is that the system is suspended only if an actuator is moving or is set to move within a defined period (e.g. within the next 5 seconds), as opposed to suspending movement by the addition of a defined period (e.g. adding 5 seconds) of non-movement to a movement profile of some or all actuators.

As an alternative to and/or in addition to a signal sent in response to application of the vehicle brakes, or deployment of an air bag, the signal may be sent in response to one or more other vehicle/user events 104a. As examples, the event(s) 104a may be movement of the steering wheel (preferably beyond a pre-determined amount and/or rate of turning), activation of a turn signal, activation of the hazard flashers, changing gears (including for example changing out of drive, changing to a lower or higher gear, changing to neutral, and/or changing to reverse), application of vehicle brakes (discussed above), rates (and/or change of rates) of accelerations and/or deceleration, activation of one or more air bags (discussed above), activation of traction control, activation of anti-lock braking (ABS), a seatbelt not fastened, a seatbelt pre-tensioner activated, open door, high speed operation of the vehicle (e.g. higher than 70, 75, 80, 85, 90, 95 or 100 miles per hour), lower speeds (or lower average speed) during a time period (see for example P in FIG. 5D, TG in FIG. 3B) or otherwise, alone or in combination, as well as optionally electrical signals corresponding to one or more of the same. As but one example, any which one of said events would occur as shown in FIG. 21 in lieu of the braking step 106, and similarly sensing of such event(s) would occur in lieu of sensing braking 108, also in FIG. 21. Sending the signal would be done in response to such triggering event to suspend one or more of seat actuators. Each of the other optional features timing parameters, and other variables as discussed, above in connection with braking and/or the application of the air bags may be used in connection with one or more of such triggering events.

As but one example setting forth one optional detail such as the events, turning the steering wheel as a triggering event may be further refined by requiring turning of the steering wheel at a certain angular rate per second, total angular displacement, the rate of change of angular velocity (e.g. acceleration of turning of the steering wheel), any combination of these, or otherwise. Additionally, triggering events may be set up in combination. For example, triggering event could include tapping of the brakes in connection with movement of the steering wheel within a certain time period thereof, such as (merely by way of non-limiting example) within less than ten seconds, preferably or less than three seconds of each other. Different optional profiles combining pairs or even more than two of these events may be included. For example, such profiles could optionally include, but not be limited to, such triggering events which correspond, or at least probabilistically correspond to evasive maneuvering of the vehicle, emergency movement or otherwise. For example, a triggering event could be rotational movement of the steering wheel at or above a rate of ten (10) degrees per second. This is by way of example only, and other degrees and other time period parameters may be selected.

While the disclosure has been illustrated and described in detail in the drawings and foregoing description, the same is to be considered as illustrative and not restrictive in character, it being understood that only the preferred embodiment has been shown and described and that all changes and modifications that come within the spirit of the disclosure are desired to be protected.

What is claimed is:

1. A vehicle seating system for reducing user fatigue, comprising:
    a seat having a seat back and a seat bottom;
    at least one powered seat adjustment actuator to slowly move said seat back incline slowly forwards and slowly backwards between at least first seat-back position and a second seat-back position, said slow movement occurring while the vehicle is moving;
    a controller for automatically controlling movement of said powered seat movement actuator while the vehicle is moving;
    wherein said seat back is moveable by said actuator in response to said automatic controller while the vehicle is moving: (a) a first average movement frequency; and, (b) a second, higher average movement frequency;
    said controller adapted for receiving at least one signal based on at least one vehicle/user event while the vehicle is moving and changing said seat back movement from said first average movement frequency to said second higher average movement frequency based at least in part on said signal;
    at least a second powered seat adjustment actuator to slowly move said seat bottom tilt slowly up and slowly down between at least first seat-bottom position and a second seat-bottom position, said slow movement occurring while the vehicle is moving;
    said controller for automatically controlling movement of said second powered seat movement actuator in response to said automatic controller while the vehicle is moving;
    wherein said seat bottom is moveable by said actuator while the vehicle is moving: (a) a first average movement frequency from said first seat-bottom position to said second seat-bottom position and back to said first seat-bottom position; and, (b) a second, higher average movement frequency from said first seat-bottom position to said second seat-bottom position and back to said first seat-bottom position;
    said controller adapted for receiving at least one signal based on at least one vehicle/user event while the vehicle is moving and changing said seat bottom movement from said first average movement frequency to said second higher average movement frequency based at least in part on said signal.

2. The system of claim 1, wherein said vehicle/user event includes, while the vehicle is moving evaluating one or more of: elapsed time, speed and/or braking.

3. The system of claim 2 wherein there is at least one stationary period of at least five minutes in duration in which powered seat actuators are motionless while the vehicle is moving, followed by said actuator movement automatically after said stationary period.

4. The system of claim 3 wherein said controller automatically adjusts movement amplitudes of one or more of said powered actuators based on said vehicle/user event.

5. The system of claim 2 wherein said controller includes at least a first preprogrammed movement profile and a second preprogrammed movement profile; wherein said first preprogrammed movement profile corresponds with said first average movement frequency, and wherein to said second preprogrammed movement profile corresponds to said second higher average movement frequency.

6. The system of claim 2 wherein said controller includes at least a first preprogrammed movement profile and at least one coefficient; wherein said first preprogrammed movement profile corresponds with said first average movement frequency, and said second higher average movement frequency is caused by said controller multiplying first preprogrammed movement profile by one or more of said coefficient.

7. The system of claim 1, wherein said vehicle/user event includes differentiating between highway driving and slower non-highway driving.

8. The system of claim 7 wherein said controller is adapted to receive a first a signal sent in response to at least one triggering event of the vehicle/user while the vehicle is moving which leads to temporary suspension of movement of said powered seat adjustment actuator.

9. The system of claim 1 and further comprising a third actuator to move a lumbar region of said seat back and forth, and a touch screen user interface provides for user selection of a lumbar movement independent of said automatically controlled movement of said seat bottom and seat back.

10. The system of claim 1 wherein said actuators each have on average movement speeds of less than 10 centimeters per second while said vehicle is moving.

11. A vehicle seating system for reducing user fatigue, comprising:
    a seat having a seat back and a seat bottom;
    at least one powered seat adjustment actuator to slowly move said seat back incline slowly forwards and slowly backwards between at least first seat-back position and a second seat-back position, said slow movement occurring while the vehicle is moving;
    a controller for automatically controlling movement of said powered seat movement actuator while the vehicle is moving;
    wherein said seat back is moveable by said actuator in response to said automatic controller while the vehicle is moving: (a) a first average movement frequency; and, (b) a second, higher average movement frequency;

said controller adapted for receiving at least one signal based on at least one vehicle/user event while the vehicle is moving and changing said seat back movement from said first average movement frequency to said second higher average movement frequency based at least in part on said signal;

wherein said average movement frequencies are of the time between movements of a corresponding powered actuator.

12. The system of claim 11, wherein said average movement frequencies are of the time between from said first positions to said second positions and back to said first positions.

13. A vehicle seating system for reducing user fatigue, comprising:
a seat having a seat back and a seat bottom;
at least one powered seat adjustment actuator to slowly move said seat back incline slowly forwards and slowly backwards between at least first seat-back position and a second seat-back position, said slow movement occurring while the vehicle is moving;
a controller for automatically controlling movement of said powered seat movement actuator while the vehicle is moving;
wherein said seat back is moveable by said actuator in response to said automatic controller while the vehicle is moving: (a) a first average movement frequency; and, (b) a second, higher average movement frequency;
said controller adapted for receiving at least one signal based on at least one vehicle/user event while the vehicle is moving and changing said seat back movement from said first average movement frequency to said second higher average movement frequency based at least in part on said signal;
wherein said controller includes at least a first preprogrammed movement profile and a second preprogrammed movement profile; wherein said first preprogrammed movement profile corresponds with said first average movement frequency, and wherein to said second preprogrammed movement profile corresponds to said second higher average movement frequency.

14. A vehicle seating system for reducing user fatigue, comprising:
a seat having a seat back and a seat bottom;
at least one powered seat adjustment actuator to slowly move said seat back incline slowly forwards and slowly backwards between at least first seat-back position and a second seat-back position, said slow movement occurring while the vehicle is moving;
a controller for automatically controlling movement of said powered seat movement actuator while the vehicle is moving;
wherein said seat back is moveable by said actuator in response to said automatic controller while the vehicle is moving: (a) a first average movement frequency; and, (b) a second, higher average movement frequency;
said controller adapted for receiving at least one signal based on at least one vehicle/user event while the vehicle is moving and changing said seat back movement from said first average movement frequency to said second higher average movement frequency based at least in part on said signal;
a third actuator to move a lumbar region of said seat back and forth, and a touch screen user interface provides for user selection of a lumbar movement independent of said automatically controlled movement of said seat bottom and seat back.

15. A vehicle seating system for reducing user fatigue, comprising:
a seat having a seat back and a seat bottom;
at least one powered seat adjustment actuator to slowly move said seat back incline slowly forwards and slowly backwards between at least first seat-back position and a second seat-back position, said slow movement occurring while the vehicle is moving;
a controller for automatically controlling movement of said powered seat movement actuator while the vehicle is moving;
wherein said seat back is moveable by said actuator in response to said automatic controller while the vehicle is moving: (a) a first average movement frequency; and, (b) a second, higher average movement frequency;
said controller adapted for receiving at least one signal based on at least one vehicle/user event while the vehicle is moving and changing said seat back movement from said first average movement frequency to said second higher average movement frequency based at least in part on said signal;
wherein said controller is adapted to receive a first a signal sent in response to at least one triggering event of the vehicle/user while the vehicle is moving which leads to temporary suspension of movement of said powered seat adjustment actuator.

16. The system of claim 15 wherein said actuators each have on average movement speeds of less than 2 centimeters per second while said vehicle is moving.

17. A vehicle seating system for reducing user fatigue, comprising:
a seat having a seat back and a seat bottom;
at least one powered seat adjustment actuator to slowly move said seat back incline slowly forwards and slowly backwards between at least first seat-back position and a second seat-back position, said slow movement occurring while the vehicle is moving;
a controller for automatically controlling movement of said powered seat movement actuator while the vehicle is moving;
wherein said seat back is moveable by said actuator in response to said automatic controller while the vehicle is moving: (a) a first average movement frequency; and, (b) a second, higher average movement frequency;
said controller adapted for receiving at least one signal based on at least one vehicle/user event while the vehicle is moving and changing said seat back movement from said first average movement frequency to said second higher average movement frequency based at least in part on said signal;
wherein said vehicle/user event includes, while the vehicle is moving: elapsed time, speed and braking.

18. The system of claim 17 wherein there is at least one stationary period of at least five minutes in duration in which powered seat actuators are motionless while the vehicle is moving, followed by said actuator movement automatically after said stationary period.

19. The system of claim 17 wherein said controller includes at least a first preprogrammed movement profile and at least one coefficient; wherein said first preprogrammed movement profile corresponds with said first average movement frequency, and said second higher average movement frequency is caused by said controller multiplying first preprogrammed movement profile by one or more of said coefficient.

20. The system of claim 17 wherein said controller automatically adjusts movement amplitude of one or more of said powered actuators based on said vehicle/user event.

21. A vehicle seating system for reducing user fatigue, comprising:
   a seat having a seat back and a seat bottom;
   at least one powered seat adjustment actuator to slowly move said seat bottom tilt slowly up and slowly down between at least first seat-bottom position and a second seat-bottom position, said slow movement occurring while the vehicle is moving;
   said controller for automatically controlling movement of said powered seat movement actuator in response to said automatic controller while the vehicle is moving;
   wherein said seat bottom is moveable by said actuator while the vehicle is moving: (a) a first average movement frequency; and, (b) a second, higher average movement frequency;
   said controller adapted for receiving at least one signal based on at least one vehicle/user event while the vehicle is moving and changing said seat bottom movement from said first average movement frequency to said second higher average movement frequency based at least in part on said signal;
   wherein said vehicle/user event includes, while the vehicle is moving evaluating one or more of: elapsed time, speed and/or braking.

22. A vehicle seating system for reducing user fatigue, comprising:
   a seat having a seat back and a seat bottom;
   at least one powered seat adjustment actuator to slowly move said seat bottom tilt slowly up and slowly down between at least first seat-bottom position and a second seat-bottom position, said slow movement occurring while the vehicle is moving;
   said controller for automatically controlling movement of said powered seat movement actuator in response to said automatic controller while the vehicle is moving;
   wherein said seat bottom is moveable by said actuator while the vehicle is moving: (a) a first average movement frequency; and, (b) a second, higher average movement frequency;
   said controller adapted for receiving at least one signal based on at least one vehicle/user event while the vehicle is moving and changing said seat bottom movement from said first average movement frequency to said second higher average movement frequency based at least in part on said signal;
   wherein said controller is adapted to receive a first a signal sent in response to at least one triggering event of the vehicle/user while the vehicle is moving which leads to temporary suspension of movement of said powered seat adjustment actuator.

* * * * *